US011784977B2

(12) United States Patent
Konda et al.

(10) Patent No.: US 11,784,977 B2
(45) Date of Patent: Oct. 10, 2023

(54) METHODS, APPARATUS, AND SYSTEMS FOR AN ENCRYPTION MODE VIA A VIRTUAL PRIVATE NETWORK

(71) Applicant: McAfee, LLC, San Jose, CA (US)

(72) Inventors: Tirumaleswar Reddy Konda, Bangalore (IN); Shashank Jain, Bengaluru (IN); Himanshu Srivastava, Bangalore (IN)

(73) Assignee: MCAFEE, LLC, San Jose, CA (US)

( * ) Notice: Subject to any disclaimer, the term of this patent is extended or adjusted under 35 U.S.C. 154(b) by 0 days.

(21) Appl. No.: 17/110,054

(22) Filed: Dec. 2, 2020

(65) Prior Publication Data

US 2022/0174044 A1 Jun. 2, 2022

(51) Int. Cl.
*H04L 29/00* (2006.01)
*H04L 9/40* (2022.01)

(52) U.S. Cl.
CPC ........ *H04L 63/0272* (2013.01); *H04L 63/029* (2013.01); *H04L 63/166* (2013.01)

(58) Field of Classification Search
CPC .. H04L 63/0272; H04L 63/029; H04L 63/166
See application file for complete search history.

(56) References Cited

U.S. PATENT DOCUMENTS

| | | | | |
|---|---|---|---|---|
| 2016/0315920 A1* | 10/2016 | Kurmala | ............. | H04L 63/0471 |
| 2020/0153805 A1* | 5/2020 | Sen | ................... | H04L 63/0457 |
| 2020/0274815 A1* | 8/2020 | Sreevalsan | .......... | H04L 47/2483 |
| 2021/0218714 A1* | 7/2021 | Wang | .................... | H04L 63/166 |
| 2021/0385070 A1* | 12/2021 | Watson | .................. | H04L 69/22 |

OTHER PUBLICATIONS

Libreswan, "Benchingmarking and Performance testing," retrieved from [https://libreswan.org/wiki/index.php?title=Benchmarking_and_Performance_testing&oldid=20825], last modified Aug. 19, 2016, 5 pages.

* cited by examiner

*Primary Examiner* — Jeffrey C Pwu
*Assistant Examiner* — Helai Salehi
(74) *Attorney, Agent, or Firm* — HANLEY, FLIGHT & ZIMMERMAN, LLC

(57) ABSTRACT

Methods, apparatus, systems and articles of manufacture for communicating encrypted data via a virtual private network are disclosed. An example computer system disclosed herein includes a memory including instructions that, when executed, cause one or more processors to establish a first tunnel and a second tunnel between a VPN client and a VPN server. The instructions further cause the one or more processors to access a request message to be sent via the VPN and determine, in response to a payload being formatted using a first protocol, whether a packet associated with the request message includes an encrypted server name indication (SNI). The instructions further cause the one or more processors to, in response to the packet including the encrypted SNI, encrypt the header of the request message to form an encrypted header, create an encrypted message including the encrypted header and the payload of the request message, and transmit the encrypted message through the first tunnel.

19 Claims, 13 Drawing Sheets

METHODS, APPARATUS, AND SYSTEMS FOR AN ENCRYPTION MODE VIA A VIRTUAL PRIVATE NETWORK

FIELD OF THE DISCLOSURE

This disclosure relates generally to virtual private networks, and, more particularly, to methods, apparatus, and systems for an encryption mode via a virtual private network.

BACKGROUND

People use the Internet to communicate with different servers and applications through their devices. Virtual Private Networks (VPNs) are used for anonymity and security when accessing various servers and networks.

BRIEF DESCRIPTION OF THE DRAWINGS

The figures are not to scale. In general, the same reference numbers will be used throughout the drawing(s) and accompanying written description to refer to the same or like parts.

Figure 1:
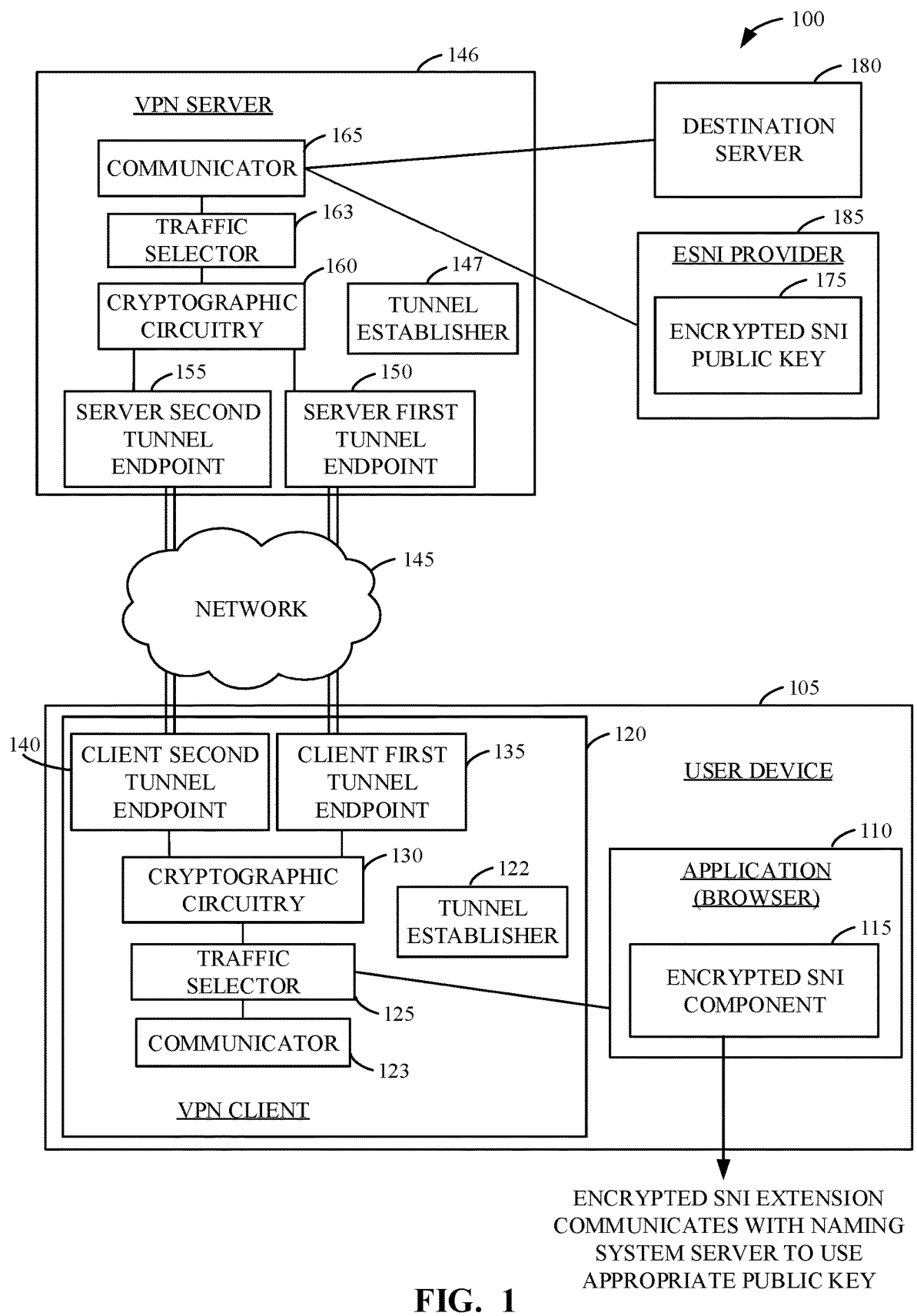
FIG. 1 is a block diagram illustrating an example environment of use including a VPN client communicating with a VPN server.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

In the field of network security, virtual private networks (VPNs) and other tunneling techniques are used for privacy and security in public networks (e.g., Wi-Fi hot spots). Typical tunnel modes used by VPNs use Encapsulating Security Payload (ESP) data packet encoding. In tunnel mode, where the entire original Internet Protocol (IP) packet is encapsulated within a new packet header, ESP protection is for the whole inner IP packet. The ESP header provides encryption, data encapsulation and data confidentiality. Encrypting the inner IP packet provides IP address privacy from eavesdroppers. However, these tunneling techniques significantly reduce the throughput, increase the latency and are computationally intensive because of having to encrypt and decrypt every packet.

Quick User Datagram Protocol (UDP) Internet Connection (QUIC) is an emerging protocol based on the User Datagram Protocol (UDP) and ensures connections are protected from tampering and disruption. QUIC ensures most of the headers are not visible to third parties. QUIC encrypts its headers and payload to avoid dependencies on other devices and/or equipment performing such encryption. Encrypted Server Name Indication (ESNI) is an optional Transport Layer Security (TLS) 1.3 extension that encrypts the Server Name Indication (SNI) information sent in the TLS Client Hello Packet. By using a protocol like QUIC in addition to ESNI, the IP header is not encrypted. The IP header is succeeded by a transport header (e.g., UPD) which is also not encrypted. The transport header is succeeded by a QUIC header where a portion of the QUIC header is not encrypted, the rest being encrypted. The information exposed by visible portion of the QUIC headers, IP header, and transport header includes the IP, port numbers, and a connection identifier, however the IP header could still be used for pervasive monitoring.

While using a VPN, the traditional method is to encrypt and then decrypt the entire packet. This method typically adds overhead due to the expensive encryption and decryption operation required for each packet. By partially encrypting the inner IP packet (e.g. encrypting only the un-encrypted part of the inner IP packet header), the VPN can save on resources and not negatively impact the privacy of the user. To decide how to encrypt IP packets, a method to dynamically identify and qualify traffic for partial encryption is needed. Example methods, systems, apparatus, and articles of manufacture disclosed herein handle IP packets based on two categories: packets that can use partial encryption due to the encryption already applied to the packet and packets where the entire packet must be encrypted. For packets that are identified as being suitable for partial encryption (e.g., packets with QUIC protocol sessions using ESNI), only the inner IP packet (e.g., the un-encrypted part of the inner IP packet) needs to be encrypted, with the encrypted application payload and signaling headers (e.g., QUIC signaling headers) used as authentication data.

Example techniques disclosed herein utilize different tunnels to transmit IP packets to a VPN server to be able to communicate which type of encryption was used on the IP packet. Accordingly, methods, systems, and apparatus that reduce amount of encryption and decryption needed to securely send IP packets via a VPN are disclosed herein. Some examples disclosed herein reduce the amount of encryption and decryption necessary when communicating data via a VPN by partially encrypting packets for selected traffic without impacting the endpoint privacy.

FIG. 1 is a block diagram illustrating an example environment 100 including an example VPN client 120 communicating with an example VPN server 146 constructed in accordance with this disclosure. The example environment 100 includes an example user device 105, an example application (browser) 110, an example SNI component 115, an example VPN client 120, an example first tunnel establisher 122, an example first communicator 123, an example first traffic selector 125, example first cryptographic circuitry 130, an example client first tunnel endpoint 135, an example client second tunnel endpoint 140, an example network 145, an example VPN server 146, an example server first tunnel endpoint 150, an example server second tunnel endpoint 155, an example second cryptographic circuitry 160, an example second traffic selector 163, an example second communicator 165, an example encrypted SNI public key 175, an example destination server 180, and an example ESNI provider 185.

The user device 105 of the illustrated example of FIG. 1 includes an application 110 and a VPN client 120. The user device 105 is configured to use the VPN client 120 to communicate with a VPN server 146 via the network 145. The example user device 105 may be implemented by any past, present, or future type of computing device including, for example, a smartphone, a tablet computer, a desktop computer, a server, a smart watch, an Internet of Things (IoT) device, etc.

The application 110 of the illustrated example of FIG. 1 is a software program executed at the user device 105. For example, the application 110 may be implemented by a web browser. The application 110 of the illustrated example of FIG. 1 includes the SNI component 115. The application 110 communicates with the VPN client 120 through the first communicator 123. The application 110 transmits messages requesting information from the destination 180 to the first communicator 123. The application 110 receives response messages from the first communicator 123. The SNI component 115 reads the encrypted SNI public key 175 to determine how the domain name is encrypted. The encryption of the encrypted SNI public key 175 reduces the risk of eavesdropping. In some examples, the application 110 may not have the encrypted SNI component 115.

The SNI component 115 of the illustrated example of FIG. 1 is implemented using an extension and/or a plugin. In this manner, the SNI component 115 can be added to an existing browser and/or other application. However, in some examples, the SNI component 115 may be implemented as a core component (e.g., native functionality) of the browser and/or other application.

The VPN client 120 of the illustrated example of FIG. 1 includes the first tunnel establisher 122, the first communicator 123, the first traffic selector 125, first cryptographic circuitry 130, the client first tunnel endpoint 135, and the client second tunnel endpoint 140. In examples disclosed herein, the example first tunnel establisher 122 may implement means for establishing, the example first communicator 123 may implement means for communicating, the example first traffic selector 125 may implement means for selecting, and the first cryptographic circuitry 130 may implement means for encrypting.

The first tunnel establisher 122 of the illustrated example of FIG. 1 communicates with the second tunnel establisher 147 in the VPN server 146 to create two tunnels for communicated messages between the VPN client 120 and the VPN server 146 via network 145. The first tunnel includes the client first tunnel endpoint 135 and the server first tunnel endpoint 150. The second tunnel includes the client second tunnel endpoint 140 and the server second tunnel endpoint 155.

The first communicator 123 of the illustrated example of FIG. 1 communicates with the application 110 to receive and transmit messages. The first communicator 123 communicates with the first traffic selector 125 to transmit request messages from the application 110. The first communicator 123 receives decrypted response messages from the first cryptographic circuitry 130.

The first traffic selector 125 of the illustrated example of FIG. 1 receives request messages from the first communicator 123. The first traffic selector 125 determines how to encrypt the request messages by determining the transport layer protocols used by the request messages. For example, the first traffic selector 125 can determine whether the request message(s) utilize QUIC transportation and/or an ESNI extension (e.g., ESNI in client hello message). In some examples, the first traffic selector 125 determines if the request message(s) utilize an authentication encryption with associated data (AEAD) encryption mechanism. Additionally, the first traffic selector 125 determines whether request messages from the first communicator 123 have an ESNI. The first traffic selector 125 sends the request messages to the first cryptographic circuitry 130 with instructions on how to encrypt the request messages.

The first cryptographic circuitry 130 of the illustrated example of FIG. 1 receives the request messages from the first traffic selector 125 with instructions on how to encrypt the request messages. The first cryptographic circuitry 130 encrypts the request messages based on instructions from the first traffic selector 125. The first cryptographic circuitry 130 sends the encrypted messages to a tunnel endpoint specified by the first traffic selector 125. The first cryptographic circuitry 130 of the illustrated example receives encrypted messages from the client first tunnel endpoint 135 and the client second tunnel endpoint 140. With the encrypted messages, the first cryptographic circuitry 130 determines how to decrypt the encrypted messages based on which tunnel the encrypted messages came from. The first cryptographic circuitry 130 decrypts the encrypted messages based on the tunnel of transit and/or other indications of the encryption type of the encrypted messages. The first cryptographic circuitry 130 transmits the decrypted messages to the first communicator 123.

The client first tunnel endpoint 135 of the illustrated example of FIG. 1 receives encrypted messages from the first cryptographic circuitry 130 and/or from the first tunnel between the client first tunnel endpoint 135 and the server first tunnel endpoint 150. The client first tunnel endpoint 135 transmits and receives encrypted messages from the server first tunnel endpoint 150 via network 145. The client first tunnel endpoint 135 sends encrypted messages from the first tunnel to the first cryptographic circuitry 130.

The client second tunnel endpoint 140 of the illustrated example of FIG. 1 receives encrypted messages from the first cryptographic circuitry 130 and/or from the second tunnel between the client second tunnel endpoint 140 and the server second tunnel endpoint 155. The client second tunnel endpoint 140 transmits and receives encrypted messages from the second tunnel endpoint 155 via network 145. The client second tunnel endpoint 140 sends encrypted messages from the second tunnel to the first cryptographic circuitry 130.

The network 145 of the illustrated example of FIG. 1 communicates information between the user device 105 and the VPN server 146. The network 145 of the illustrated example of FIG. 1 is the Internet. The network 145 is not limited to a network of interconnected computer networks that use an internet protocol (TCP/IP), and can also include other high-speed data networks and/or telecommunication networks that are configured to communicate information back and forth to the user device 105.

The VPN server 146 of the illustrated example of FIG. 1 includes the second tunnel establisher 147, the second communicator 165, the second traffic selector 163, second cryptographic circuitry 160, the server first tunnel endpoint 150, and the server second tunnel endpoint 155. In examples disclosed herein, the example second tunnel establisher 147 may implement means for establishing, the example second communicator 165 may implement means for communicating, the example second traffic selector 163 may implement means for selecting, and the example second cryptographic circuitry 160 may implement means for encrypting.

The second tunnel establisher 147 communicates with the first tunnel establisher 122 in the VPN client 120 to create the tunnels for sending messages between the VPN client 120 and the VPN server 146 via network 145.

The server first tunnel endpoint 150 of the illustrated example of FIG. 1 transmits and receives encrypted messages from the client first tunnel endpoint 135 in the VPN client 120 via the network 145. The server first tunnel endpoint 150 sends the second cryptographic circuitry 160 encrypted messages. The server first tunnel endpoint 150 receives encrypted messages from the first cryptographic circuitry 160.

The server second tunnel endpoint 155 of the illustrated example of FIG. 1 sends the second cryptographic circuitry 160 encrypted messages. The server second tunnel endpoint 155 receives encrypted messages from the second cryptographic circuitry 160. The server second tunnel endpoint 155 transmits and receives encrypted messages from the client second tunnel endpoint 140 via the network 145.

The second cryptographic circuitry 160 of the illustrated example of FIG. 1 receives encrypted messages from the server first tunnel endpoint 150 and the server second tunnel endpoint 155. With the encrypted messages, the second cryptographic circuitry 160 determines how to decrypt the encrypted messages based on which tunnel the encrypted messages came from. The second cryptographic circuitry 160 decrypts the encrypted messages according to the tunnels that the encrypted messages originated from. The second cryptographic circuitry 160 transmits information indicating which tunnel the encrypted message came from to the second traffic selector 163. The second cryptographic circuitry 160 receives response messages and instructions for encryption from the second traffic selector 163. The second cryptographic circuitry 160 encrypts the response messages based on instructions from the second traffic selector 163.

The second traffic selector 163 of the illustrated example of FIG. 1 receives information about the encryption of incoming messages from the second cryptographic circuitry 160. The second traffic selector 163 saves the information about the encryption of the encrypted messages. The second traffic selector 163 receives response messages from the second communicator 165. The second traffic selector 163 determines how to encrypt messages by remembering how the request message was encrypted (e.g., which protocol was used, which portions of the packet were encrypted, etc.). The second traffic selector 163 sends the second cryptographic circuitry 160 the response messages from the second communicator 165 and instructions on how to encrypt the response messages.

The second communicator 165 of the illustrated example of FIG. 1 receives decrypted messages from the second cryptographic circuitry 160. The second communicator 165 transmits decrypted messages to the destination server 180. The destination server 180 sends a response to the VPN server 146. The second communicator 165 receives response messages from the destination server 180 and sends response messages to the second traffic selector 163.

The ESNI provider 185 of the illustrated example of FIG. 1 is implemented by a domain name service (DNS) server that provides an encrypted SNI public key 175. In some examples, the ESNI provider 185 may not include the encrypted SNI public key 175, but may instead, retrieve the public key 175 from another location and/or direct the request to a different location (e.g., another DNS server). In some examples, the encrypted SNI component 115 uses the encrypted SNI public key 175 to encrypt messages.

In operation, the application 110 requests data from the destination server 180. To send the request message via a VPN, the application 110 asks ESNI provider 185 for the IP address of destination server 180. Information concerning the IP address of destination server 180 can include a public key for the destination server 180. The user device 105 can encrypt the SNI using the public key contained in the information concerning the IP address of destination server 180. Additionally, the VPN client 120 and the VPN server 146 negotiate the creation of tunnels between the VPN client 120 and the VPN server 146 over the network 145.

The application 110 transmits the request message to the VPN client 120. The VPN client 120 encrypts the request message using the first traffic selector 125 and the first cryptographic circuitry 130. The first cryptographic circuitry 130 then sends the encrypted message to the VPN server 146 over a tunnel via network 145. The VPN server 146 decrypts the encrypted message using the second cryptographic circuitry 160. The second cryptographic circuitry 160 sends the decrypted message to the second communicator 165. The second communicator 165 sends the decrypted message to the destination server 180.

The destination server 180 creates a response message. The destination server 180 transmits the response message to the VPN server 146. The VPN server 146 encrypts the response message using the second traffic selector 163 and the second cryptographic circuitry 160. The second cryptographic circuitry 160 transmits the encrypted message to the VPN client 120 over a tunnel via network 145. The VPN client 120 decrypts the encrypted message using the first cryptographic circuitry 130. The first cryptographic circuitry 130 sends the decrypted message to the first communicator 123. The first communicator 123 transmits the decrypted message to the application 110. The application 110 determines if there are more requests to communicate or if the connection can be ended.

The example first tunnel establisher 122, the example first communicator 123, the example first traffic selector 125, the example first cryptographic circuitry 130, the example client first tunnel endpoint 135, the example client second tunnel endpoint 140 of the example VPN client 120 the illustrated example of FIG. 1 are implemented by one or more logic circuits such as, for example, hardware processors. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. Likewise, the example second tunnel establisher 147, the example server first tunnel endpoint 150, the example server second tunnel endpoint 155, the example second cryptographic circuitry 160, the example second traffic selector 163, and the example second communicator 165 of the example VPN server 146 of the illustrated example of FIG. 1 are implemented by one or more logic circuits such as, for example, hardware processors. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc.

Figure 2:
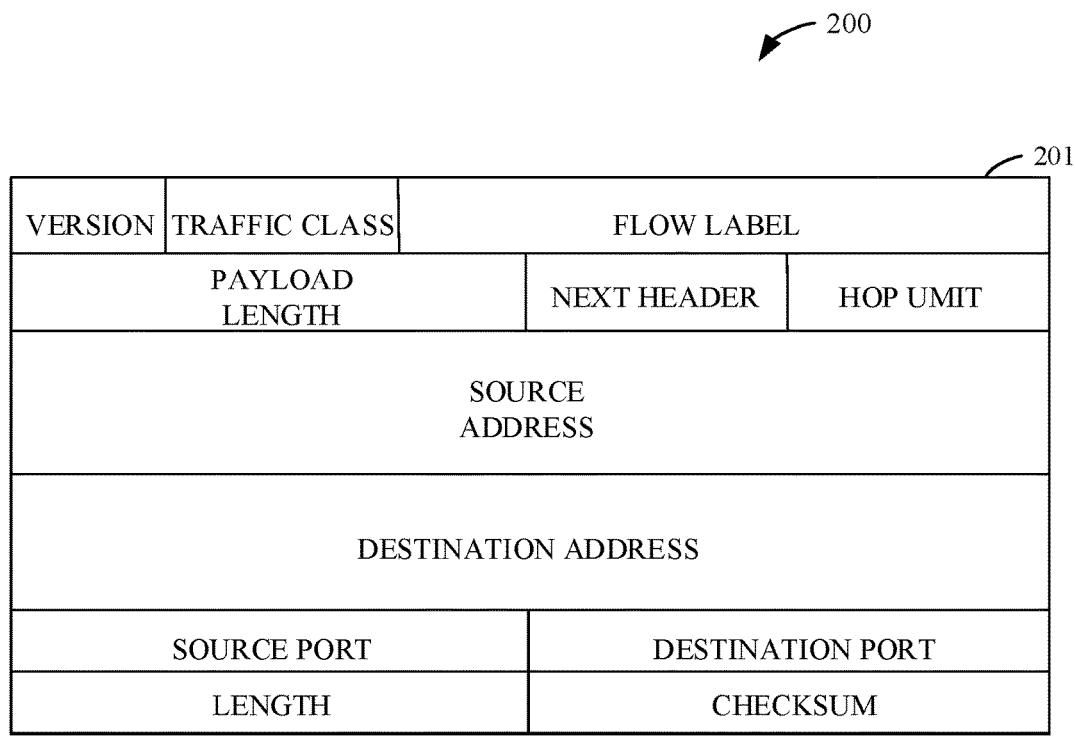
FIG. 2 is an example structure of an IP header packet using QUIC.
Figure 2:
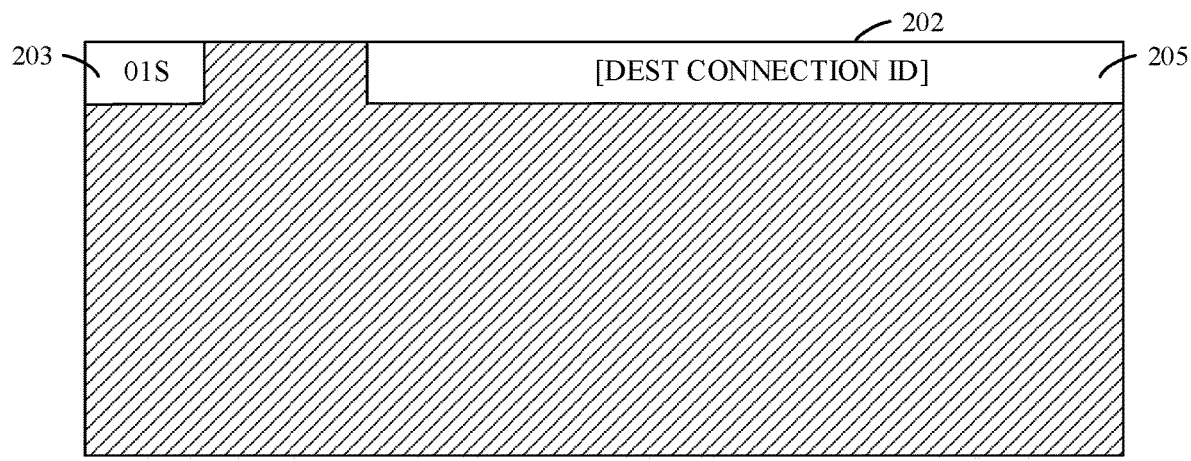

FIG. 2 is an example structure of an IP header packet using QUIC.

Example table 201 of the IP header packet 200 is a template of an IP header without any encryption. Example table 202 of IP header packet 200 illustrates the packet after encryption. Table 202 includes an example version number 203 and an example destination connection ID 205. The blacked-out section of table 202 contains sensitive information to be kept confidential. The version number 203 allows a recipient of the IP header packet 200 to know how to open it. With the use of the QUIC protocol, the destination connection ID 205 is the only part of the header that is visible while the rest of the header and payload of the IP header packet 200 is encrypted. The destination connection ID 205 does not contain any privacy-sensitive information.

Ordinarily, if an IP packet has a QUIC protocol used on the payload of the IP packet, the entire IP packet will be re-encrypted when it is sent over a VPN connection. However, since only non-personal data of the IP packet (e.g., connection identifier, IP address, transport protocol, etc.) is visible when using a QUIC protocol, this re-encryption is redundant, computationally expensive, and adds little extra privacy protection. Because of this small increase in protection but high use of resources, using an encryption protocol that re-encrypts the entire IP packet increases latency. By leveraging the QUIC encryption of the payload of the IP packet, partial encryption as disclosed herein reduces latency compared to current solutions while maintaining the security of the information.

Figure 3:
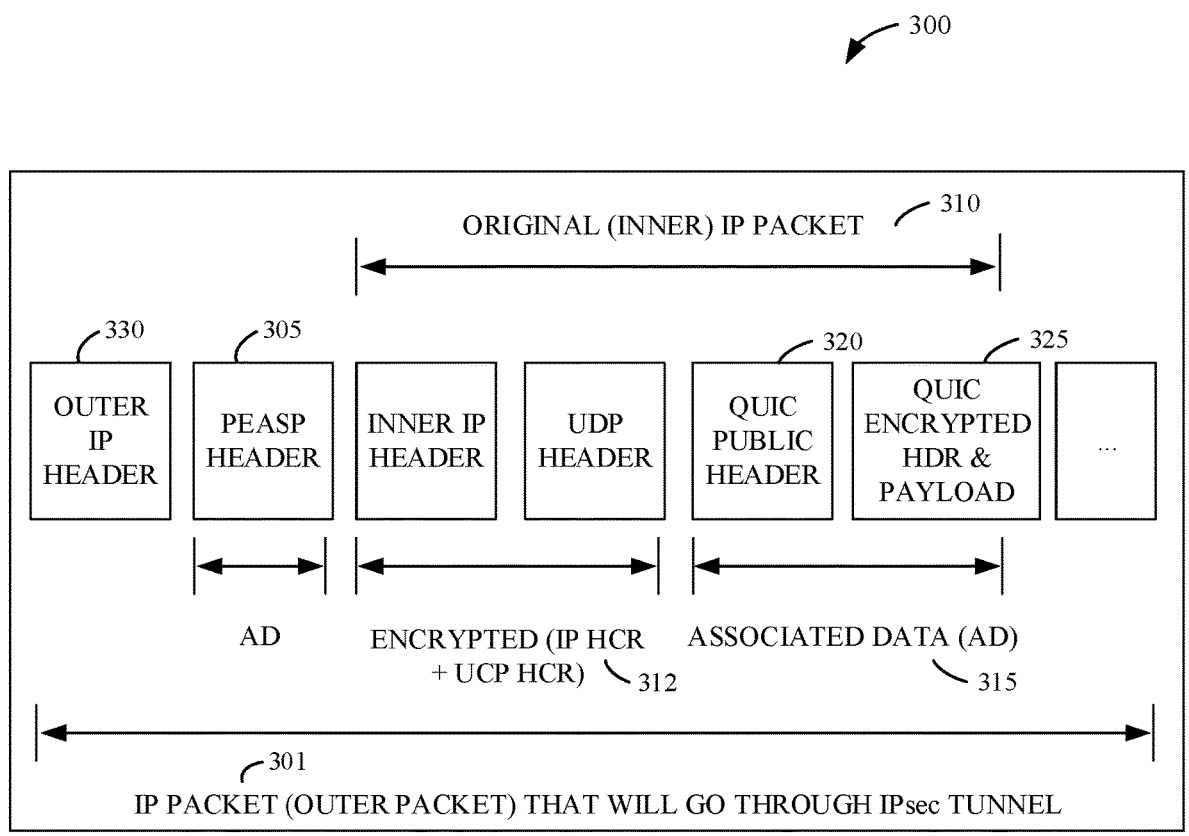
FIG. 3 is an example packet structure in the tunnel mode using the Partially Encrypted & Authenticated Security Payload (PEASP) protocol.

FIG. 3 is an example packet structure 300 in the tunnel mode using an example Partially Encrypted & Authenticated Security Payload (PEASP) protocol, as disclosed herein.

An example outer IP packet 301 includes an example PEASP header 305 and an example inner IP packet 310. The inner IP packet 310 includes the original IP packet that has an example header 312 which is encrypted by the PEASP protocol and appended as example associated data 315 which includes information already encrypted by the QUIC protocol. The associated data 315 includes an example QUIC public header 320 and an example QUIC encrypted payload 325. The QUIC public header 320 only has a fixed length visible as seen in the destination connection ID 205 in FIG. 2. The QUIC encrypted payload 325 needs no further encryption. Because the inner IP packet 310 is using the QUIC protocol on the payload of the packet, the PEASP protocol creates the outer IP packet 301 by passing the QUIC encrypted portions of the inner IP packet 310 as associated data 315 and encrypts the visible header 312. The inner IP packet 310 becomes the payload of the new outer IP packet 301. The headers of the outer IP packet 301 are an example new outer IP header 330 and the PEASP header 305. Thus, the PEASP protocol has encrypted the inner IP packet 310 with a high level of security but without needing to re-encrypt the entire packet.

While an example manner of implementing the VPN client 120 is illustrated in FIG. 1, one or more of the elements, processes and/or devices illustrated in FIG. 1 may be combined, divided, re-arranged, omitted, eliminated and/or implemented in any other way. Further, the example first tunnel establisher 122, the example first communicator 123, the example first traffic selector 125, the example first cryptographic circuitry 130, the example client first tunnel endpoint 135, the example client second tunnel endpoint 140, and/or, more generally, the example VPN client 120 of FIG. 1 may be implemented by hardware, software, firmware and/or any combination of hardware, software and/or firmware. Thus, for example, any of the example first tunnel establisher 122, the example first communicator 123, the example first traffic selector 125, the example first cryptographic circuitry 130, the example client first tunnel endpoint 135, the example client second tunnel endpoint 140 and/or, more generally, the example VPN client 120 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first tunnel establisher 122, the example first communicator 123, the example first traffic selector 125, the example first cryptographic circuitry 130, the example client first tunnel endpoint 135, the example client second tunnel endpoint 140 is/are hereby expressly defined to include a non-transitory computer readable storage device or storage disk such as a memory, a digital versatile disk (DVD), a compact disk (CD), a Blu-ray disk, etc. including the software and/or firmware. Further still, the example VPN client 120 of FIG. 1 may include one or more elements, processes and/or devices in addition to, or instead of, those illustrated in FIG.

1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Additionally, while an example manner of implementing the VPN server 146 is illustrated in FIG. 1, one or more of the elements, processes and/or devices illustrated in FIG. 1 may be combined, divided, re-arranged, omitted, eliminated and/or implemented in any other way. Further, the example server first tunnel endpoint 150, the example server second tunnel endpoint 155, the example second tunnel establisher 147, the example second cryptographic circuitry 160, the example second traffic selector 163, the example second communicator 165 and/or, more generally, the example VPN server 146 of FIG. 1 may be implemented by hardware, software, firmware and/or any combination of hardware, software and/or firmware. Thus, for example, any of the example server first tunnel endpoint 150, the example server second tunnel endpoint 155, the example second tunnel establisher 147, the example second cryptographic circuitry 160, the example second traffic selector 163, the example second communicator 165 and/or, more generally, the example VPN server 146 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example server first tunnel endpoint 150, the example server second tunnel endpoint 155, the example second tunnel establisher 147, the example second cryptographic circuitry 160, the example second traffic selector 163, and/or the example second communicator 165 is/are hereby expressly defined to include a non-transitory computer readable storage device or storage disk such as a memory, a digital versatile disk (DVD), a compact disk (CD), a Blu-ray disk, etc. including the software and/or firmware. Further still, the example VPN server 146 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
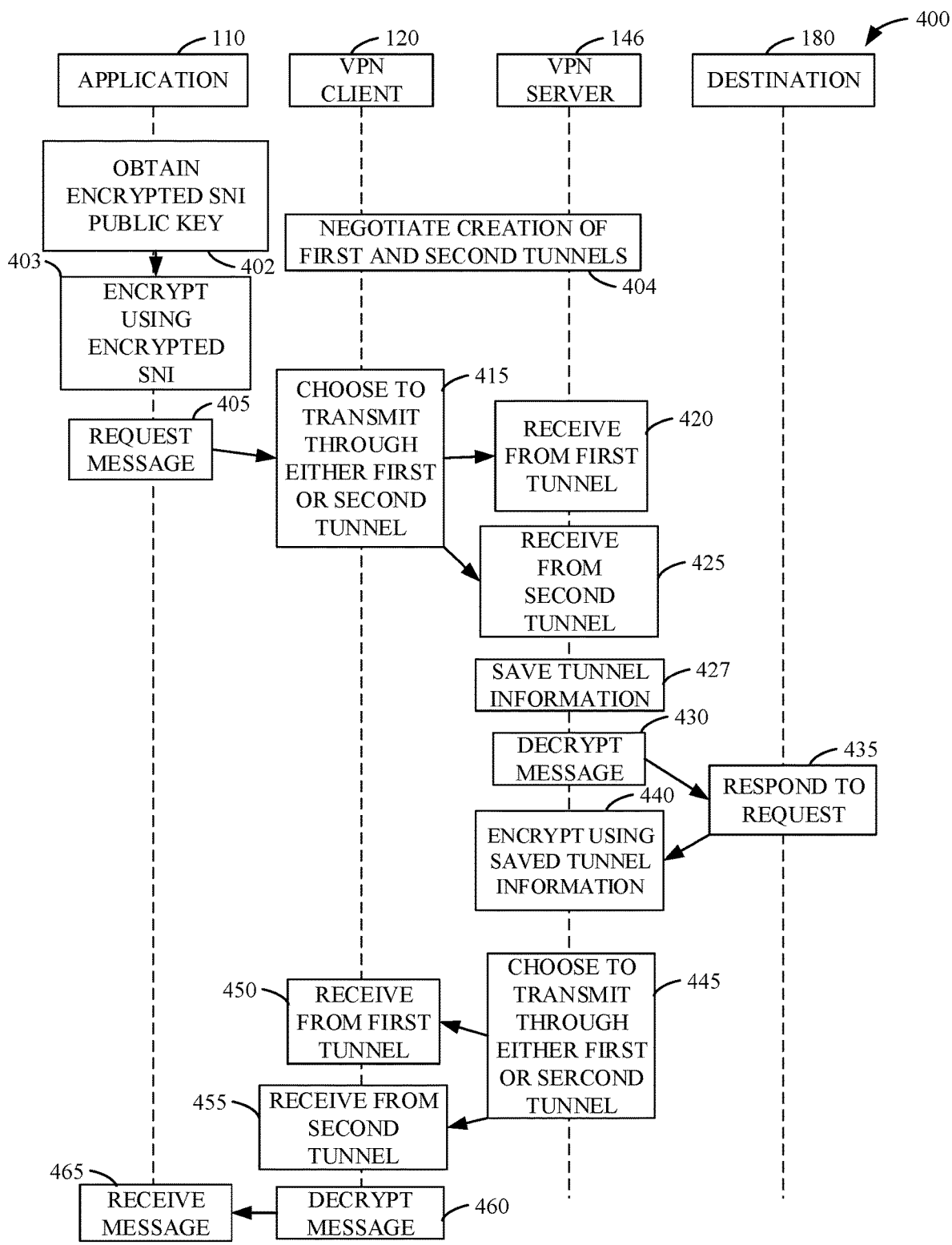
FIG. 4 is a block diagram representing example communications between the VPN client and the VPN server of FIG. 1.
Figure 5:
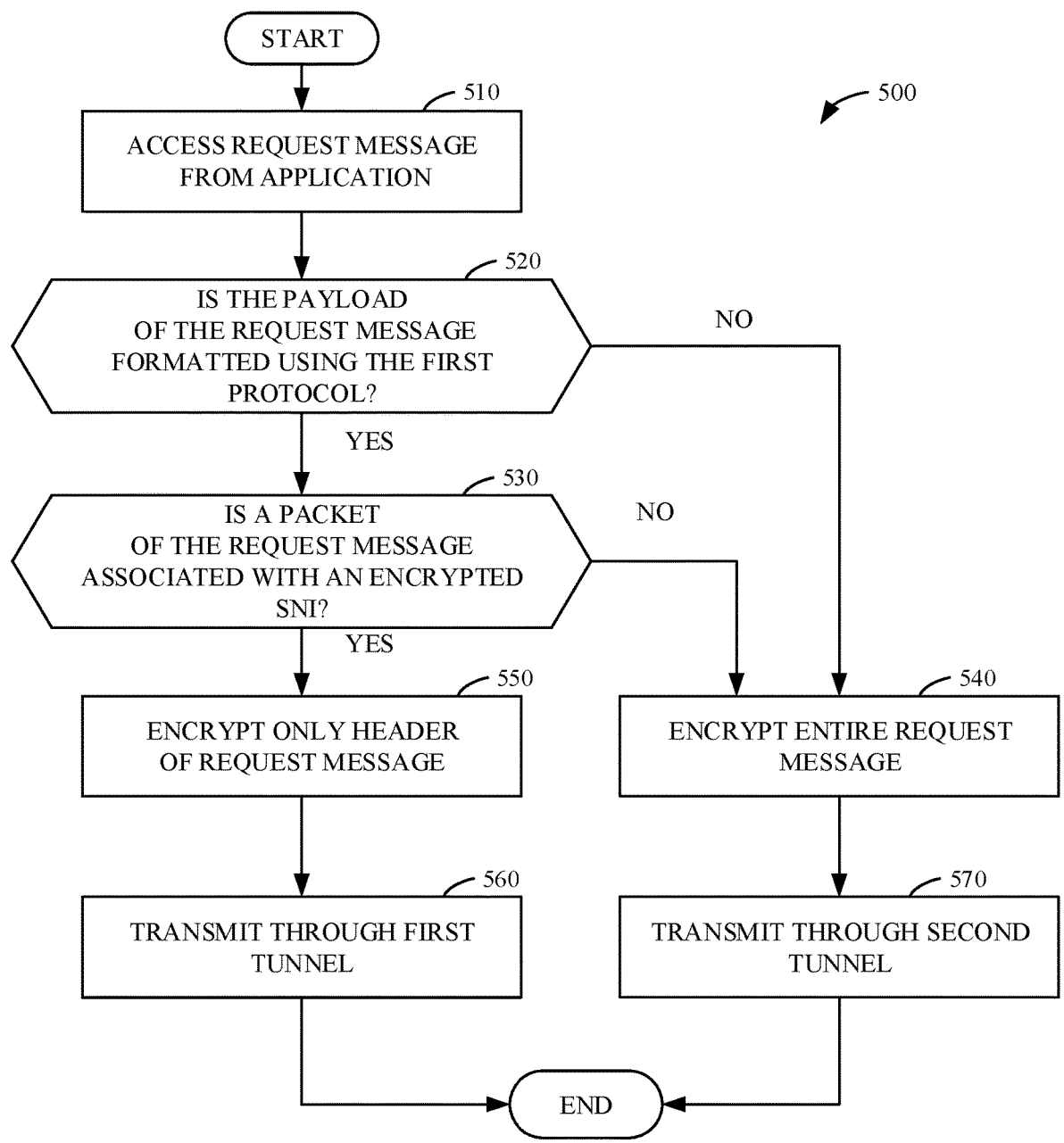
FIG. 5 is a flowchart representative of machine readable instructions which may be executed to implement the example VPN client of FIG. 1 to transmit data.
Figure 8:
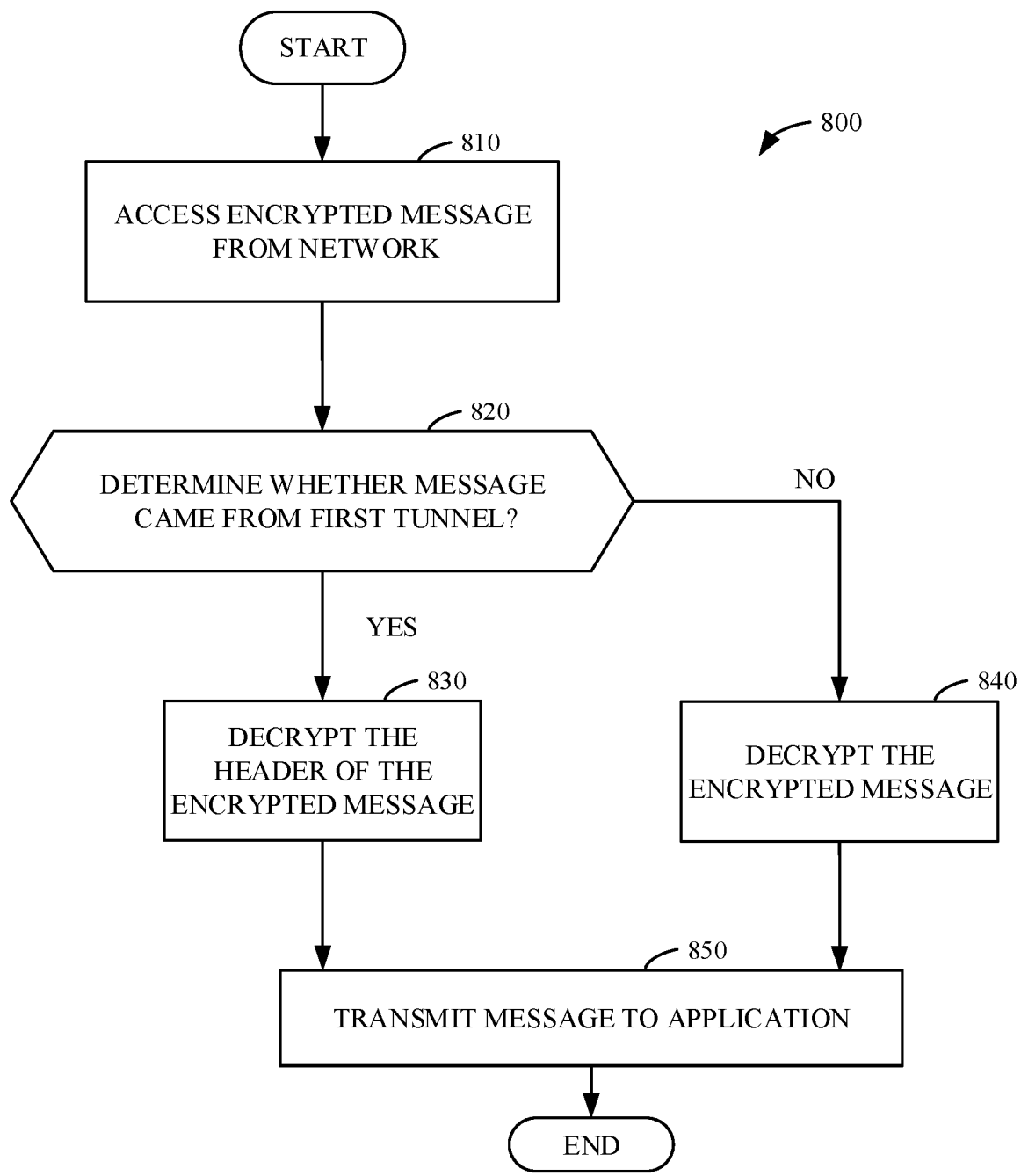
FIG. 8 is a flowchart representative of machine readable instructions which may be executed to implement the example VPN client of FIG. 1 to decrypt and transmit data.

Flowcharts representative of example hardware logic, machine readable instructions, hardware implemented state machines, and/or any combination thereof for implementing the VPN client 120 of FIG. 1 are shown in FIGS. 4, 5, and 8. The machine readable instructions may be one or more executable programs or portion(s) of an executable program for execution by a computer processor and/or processor circuitry, such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 4, 5, and 8, many other methods of implementing the example VPN client 120 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 6:
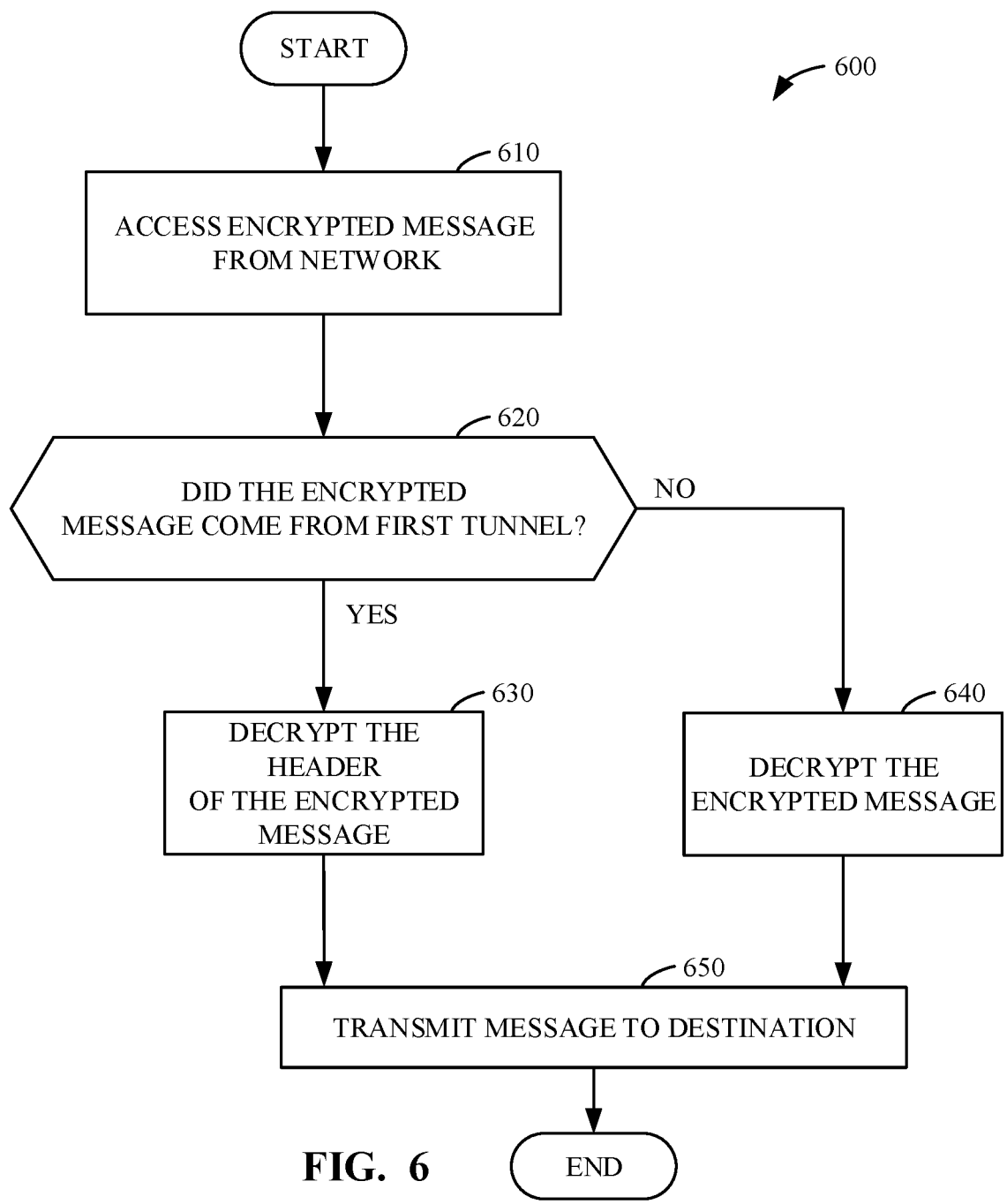
FIG. 6 is a flowchart representative of machine readable instructions which may be executed to implement the example VPN server of FIG. 1 to decrypt and transmit data.
Figure 7:
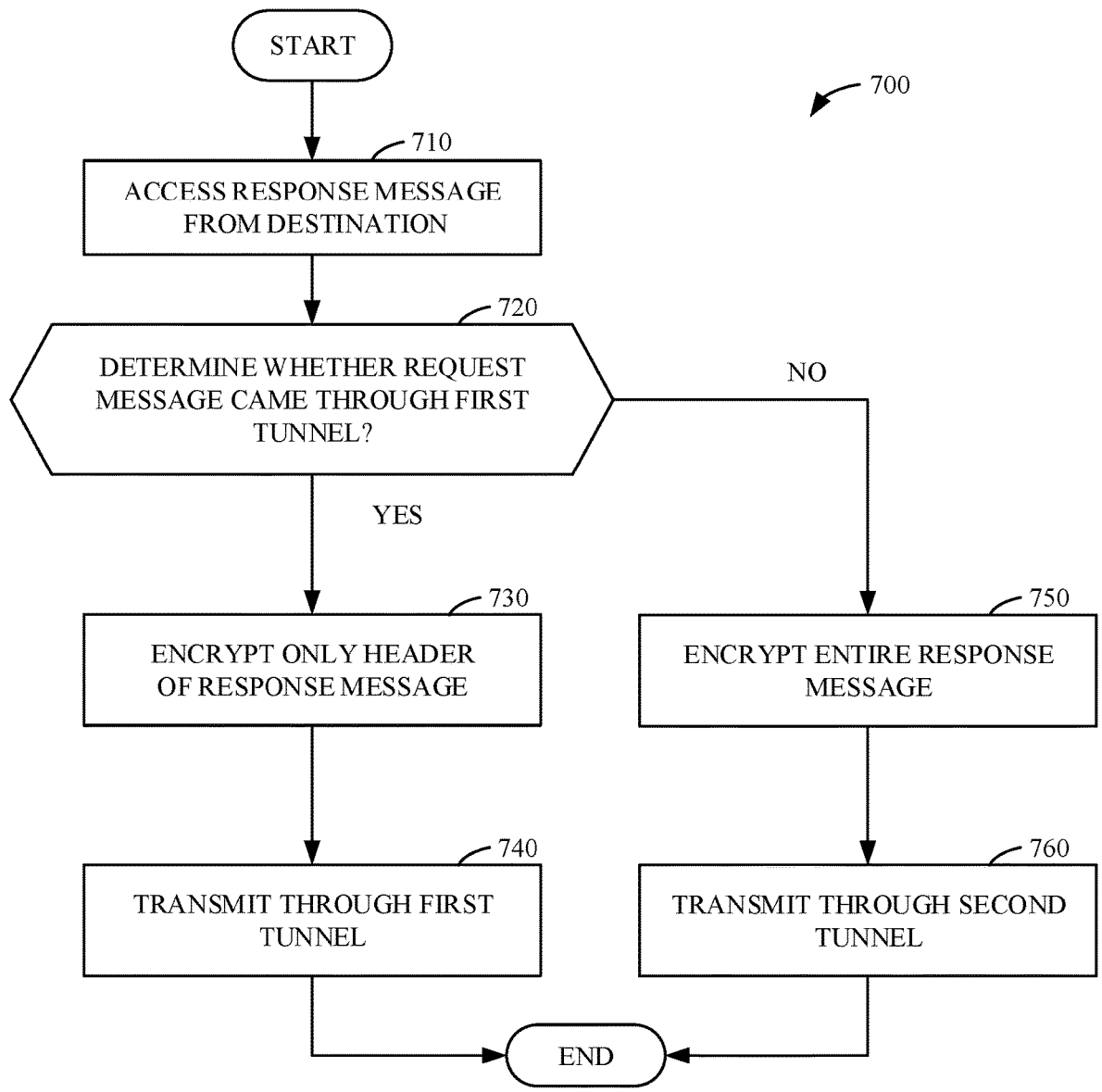
FIG. 7 is a flowchart representative of machine readable instructions which may be executed to implement the example VPN server of FIG. 1 to encrypt and transmit data.

Flowcharts representative of example hardware logic, machine readable instructions, hardware implemented state machines, and/or any combination thereof for implementing the VPN server 146 of FIG. 1 are shown in FIGS. 4, 6, and 7. The machine readable instructions may be one or more executable programs or portion(s) of an executable program for execution by a computer processor and/or processor circuitry, such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 4, 6, and 7, many other methods of implementing the example VPN server 146 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5, 6, 7, and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 4 is a block diagram representing example communications between the VPN client 120 and the VPN server 146 of FIG. 1. The example process 400 of FIG. 4 begins when the example application 110 obtains the encrypted SNI public key 175 via the ESNI provider 185. (Block 402). The application 110 uses the encrypted SNI information to communicate with the destination server 180. Because the SNI is encrypted, the risk of domain eavesdropping is reduced. However, in some examples, the application 110 may not obtain encrypted SNI public key 175 via the ESNI provider 185 because the destination server 180 is not available. Further, the application 110 may not obtain the encrypted SNI public key information because the application 110 may not have the encrypted SNI component 115.

The application 110 encrypts a destination server name using the encrypted SNI information. (Block 403). The application 110 uses the encrypted SNI information to communicate with the destination server 180 without revealing the intended hostname to any intermediate monitoring entity. However, in some examples, the application 110 encrypts the message without the use of encrypted SNI information because, for example, the application 110 may not have obtained the encrypted SNI information. Additionally, the application 110 may encrypt its message without an encrypted SNI because the application 110 may not have an encrypted SNI component 115 and/or the application 110 did not receive the public key to encrypt the SNI value.

The VPN client 120 and the VPN server 146 negotiate the creation of a first and second tunnel. (Block 404). The VPN client 120 uses the first tunnel establisher 122 to negotiate with the VPN server 146 and the second tunnel establisher 147. The negotiation may create any number of tunnels (e.g., one for each encryption method, more than one for each encryption method, etc.).

The application 110 sends the VPN client 120 the request message requesting data from the destination server 180. (Block 405). In examples disclosed herein, the request message is formatted as a hypertext transfer markup language (HTML) request message. However, any other past, present, and/or future message protocol and/or format may additionally or alternatively be used.

The VPN client 120 determines which tunnel the request message should be transmitted through. (Block 415). The VPN client 120 encrypts the request message based on the tunnel that the request message is to be sent through. For example, if the message is to be sent through the first tunnel, only the header of the request message is encrypted (as the remainder of the message is already encrypted), whereas if the message is to be sent through the second tunnel, the entirety of the request message is encrypted. The VPN client 120 transmits the newly encrypted message through the determined tunnel.

The VPN server 146 receives the encrypted message from the server first tunnel endpoint 150. (Block 420). In some examples, the VPN server 146 may receive the encrypted message from the second tunnel endpoint 155. (Block 425). The VPN server 146 saves information about the tunnel from which the encrypted message originated. (Block 427). The VPN server 146 decrypts the encrypted message based on which tunnel the encrypted message originated. (Block 430). The VPN server 146 sends the decrypted message to the destination server 180 via network 145.

The destination server 180 receives and/or otherwise retrieves the decrypted message and accesses the decrypted message and creates a response message that is sent to the VPN server 146. (Block 435). The VPN server 146 receives the response message. Using the previously stored tunnel information, the VPN server 146 encrypts the response message. (Block 440). In some examples, if the original request message traversed the first tunnel, the response may be encrypted using PEASP. In some examples, if the original request message traversed the second tunnel, the response may be fully encrypted.

The VPN server 146 chooses which tunnel the response message will be transmitted through. (Block 445). The VPN server 146 encrypts the response message based on the information saved about which tunnel the previous encrypted message came through, and transmits the encrypted message to the VPN client 120 through the selected tunnel.

In some examples, the VPN client 120 receives the encrypted response message from the client first tunnel endpoint 135. (Block 450). In some examples, the VPN client 120 receives the encrypted message from the second endpoint tunnel endpoint 140. (Block 455). The VPN client 120 decrypts the encrypted response message based on the tunnel from which the encrypted response message originated. (Block 460). The VPN client 120 thus creates a decrypted response message, which is then provided to the application 110.

The application 110 receives the decrypted message from the VPN client 120. (Block 465). If the application 110 has more requests for the destination server 180, the example process 400 resumes at block 405, where subsequent request messages are provided to the VPN client 120 by the application for transmission to a destination.

FIG. 5 is a flowchart representative of example machine readable instructions 500 which may be executed to implement the example VPN client 120 of FIG. 1 to transmit data. With reference to the preceding figures and associated description, the example machine readable instructions 500 of FIG. 5 begin with the first communicator 123 accessing a request message from the application 110. (Block 510). In some examples, the first communicator 123 provides the request message to the first traffic selector 125.

The first traffic selector 125 determines whether the payload of the request message is formatted using a first protocol. (Block 520). In some examples, the first protocol is a QUIC protocol. However, any other past, present, or future communication protocol may additionally or alternatively be used.

If the payload of the request message is formatted using the first protocol (e.g., block 520 returns a result of YES), the first traffic selector 125 determines whether a packet of the request message is associated with an encrypted SNI. (Block 530). This second comparison is done to ensure that the intended domain name that the request message is to be sent to is encrypted. By having the intended domain name encrypted, an on-path observer cannot track the sites that a user is visiting, meaning that the request message does not have to be fully encrypted to travel over the network. In response to the packet of the request message being associated with an encrypted SNI, processing transfers to block 550. Conversely, in response to the packet of the request message not being associated with an encrypted SNI, processing transfers to block 540.

If the packet of the request message is associated with the encrypted SNI (e.g. the block 530 returns a result of YES), the first traffic selector 125 sends the message to the first cryptographic circuitry 130 with instructions to only encrypt the header of the request message.

The first cryptographic circuitry 130 encrypts only the header of the request message according to the instructions from the first traffic selector 125. (Block 540). In doing so, the first cryptographic circuitry 130 creates a new encrypted message. In examples disclosed herein, the first cryptographic circuitry 130 encrypts the header using an encryption protocol that is different from the encryption protocol used by the payload of the request message. (Block 550). In some examples, the same encryption protocol that is used to encrypt the payload of the request message is also used to encrypt the header of the request message. In such an example, however, the encryption keys used to encrypt the header and the payload of the message may be different. The first cryptographic circuitry 130 transmits the encrypted message through the client first tunnel endpoint 135. (Block 560).

If the payload of the request message is not formatted using the first protocol (e.g., block 520 returns a result of NO), or if the request message does not use the encrypted SNI (e.g., block 530 returns a result of NO), the first traffic selector 125 sends the request message to the first cryptographic circuitry 130 with instructions to encrypt the entire request message. The first cryptographic circuitry 130 encrypts the entire request message according to the instructions from the first traffic selector 125. (Block 540). In doing so, the first cryptographic circuitry 130 creates an encrypted message. The first cryptographic circuitry 130 transmits the encrypted message through the client second tunnel endpoint 140. (Block 570). The example machine readable instructions 500 of FIG. 5 then terminate but may, for example, be repeated upon receipt of a subsequent request message from the application 110.

FIG. 6 is a flowchart representative of machine readable instructions 600 which may be executed to implement the example VPN server 146 of FIG. 1 to decrypt and transmit data. With reference to the preceding figures and associated descriptions, the example machine readable instructions 600 of FIG. 6 begin with the second cryptographic circuitry 160 receiving an encrypted message from network 145 through a tunnel endpoint. (Block 610). In some examples, the second cryptographic circuitry 160 receives the encrypted message from the server first tunnel endpoint 150. In some examples, the second cryptographic circuitry 160 receives the encrypted message from the server second tunnel endpoint 155. The second cryptographic circuitry 160 determines if the encrypted message came from the server first tunnel endpoint 150 or the second tunnel endpoint 155. (Block 620). The second cryptographic circuitry 160 sends the second traffic selector 163 information about which tunnel the encrypted message came from. In response to determining the encrypted message came from the first tunnel, processing transfers to block 630. Conversely, in response to determining the encrypted message did not come from the first tunnel, processing transfers to block 640.

If the encrypted message came from the server first tunnel endpoint 150 (e.g., block 620 returns a result of YES), the second cryptographic circuitry 160 decrypts the header of the encrypted message to create a decrypted header. (Block 630). In doing so, the second cryptographic circuitry 160 creates a new decrypted message.

If the encrypted message came from the second tunnel endpoint 155 (e.g., block 620 returns a result of NO), the second cryptographic circuitry 160 decrypts the entire encrypted message. (Block 640). In doing so, the second cryptographic circuitry 160 creates a new decrypted message.

The second cryptographic circuitry 160 communicates the decrypted message to the second communicator 165 which transmits the decrypted message to the destination server 180. (Block 650). The example machine readable instructions 600 of FIG. 6 then terminate but may, for example, be repeated upon receipt of a subsequent encrypted message from the VPN client 120.

FIG. 7 is a flowchart representative of machine readable instructions 700 which may be executed to implement the example VPN server 146 of FIG. 1 to transmit data. With reference to the preceding figures and associated description, the example machine readable instructions 700 of FIG. 7 begin with the second communicator 165 receiving a response message from the destination server 180. (Block 710). The second communicator 165 provides the response message to the second traffic selector 163.

The second traffic selector 163 determines which tunnel the previous encrypted message came from, using previously stored tunnel information. (Block 720). In response to determining that the request message came through the first tunnel, processing transfers to block 730. Conversely, in response to determining that the request message did not come through the first tunnel, processing transfers to block 750.

If the previous encrypted message came from the server first tunnel endpoint 150 (e.g., block 720 returns a result of YES), the second traffic selector 163 sends the response message to the second cryptographic circuitry 160 with instructions to encrypt the header of the response message. The second cryptographic circuitry 160 encrypts the header of the response message according to the instructions of the second traffic selector 163. (Block 730). In examples disclosed herein, the second cryptographic circuitry 160 encrypts the header using an encryption protocol that is different from the encryption protocol used by the payload of the response message. In some examples, the same encryption protocol that is used to encrypt the payload of the response message is also used to encrypt the header of the response message. In such an example, however, the encryption keys used to encrypt the header and the payload of the message may be different. In doing so, the second cryptographic circuitry 160 creates a new response encrypted message. The second cryptographic circuitry 160 transmits the encrypted message through the server first tunnel endpoint 150. (Block 740).

If the previous encrypted message came from the server second tunnel endpoint 155 (e.g., block 720 returns a result of NO), the second traffic selector 163 sends the response message to the second cryptographic circuitry 160 with instructions to encrypt the whole response message. The second cryptographic circuitry 160 encrypts the whole response message according to the instructions of the second traffic selector 163. (Block 750). In doing so, the second cryptographic circuitry 160 creates a new encrypted message. The second cryptographic circuitry 160 transmits the encrypted message through the server second tunnel endpoint 155. (Block 760).

The example machine readable instructions 700 of FIG. 7 then terminate but may, for example, be repeated upon receipt of a subsequent encrypted message from the destination server 180.

FIG. 8 is a flowchart representative of machine readable instructions which may be executed to implement the example VPN client 120 of FIG. 1 to decrypt and transmit data. With reference to the preceding figures and associated description, the example machine readable instructions 800 begin with the first cryptographic circuitry 130 receiving an encrypted message from the network 145 through a tunnel endpoint. (Block 810). The first cryptographic circuitry 130 can receive the encrypted message from the client first tunnel endpoint 135. In some examples, the first cryptographic circuitry 130 can receive the encrypted message from the client second tunnel endpoint 140. The first cryptographic circuitry 130 determines if the encrypted message came from the client first tunnel endpoint 135 or the client second tunnel endpoint 140. (Block 820). In response to determining that the message came from the client first tunnel endpoint 135, processing transfers to block 830. Conversely, in response to determining that the message did not come from the client first tunnel endpoint 135, processing transfers to block 840.

If the encrypted message came from the client first tunnel endpoint 135 (e.g., block 820 returns a result of YES), the first cryptographic circuitry 130 decrypts the header of the encrypted message. (Block 830). In doing so, the first cryptographic circuitry 130 creates a new decrypted message.

If the encrypted message came from the client second tunnel endpoint 140 (e.g., block 820 returns a result of NO), the first cryptographic circuitry 130 decrypts the entire encrypted message. (Block 840). In doing so, the first cryptographic circuitry 130 creates a new decrypted message.

The first cryptographic circuitry 130 transmits the decrypted message to the first communicator 123 which sends the decrypted message to the application 110. (Block 850). The example machine readable instructions 800 of FIG. 8 then terminate but may, for example, be repeated upon receipt of a subsequent encrypted message from the VPN server 146.

Figure 9:
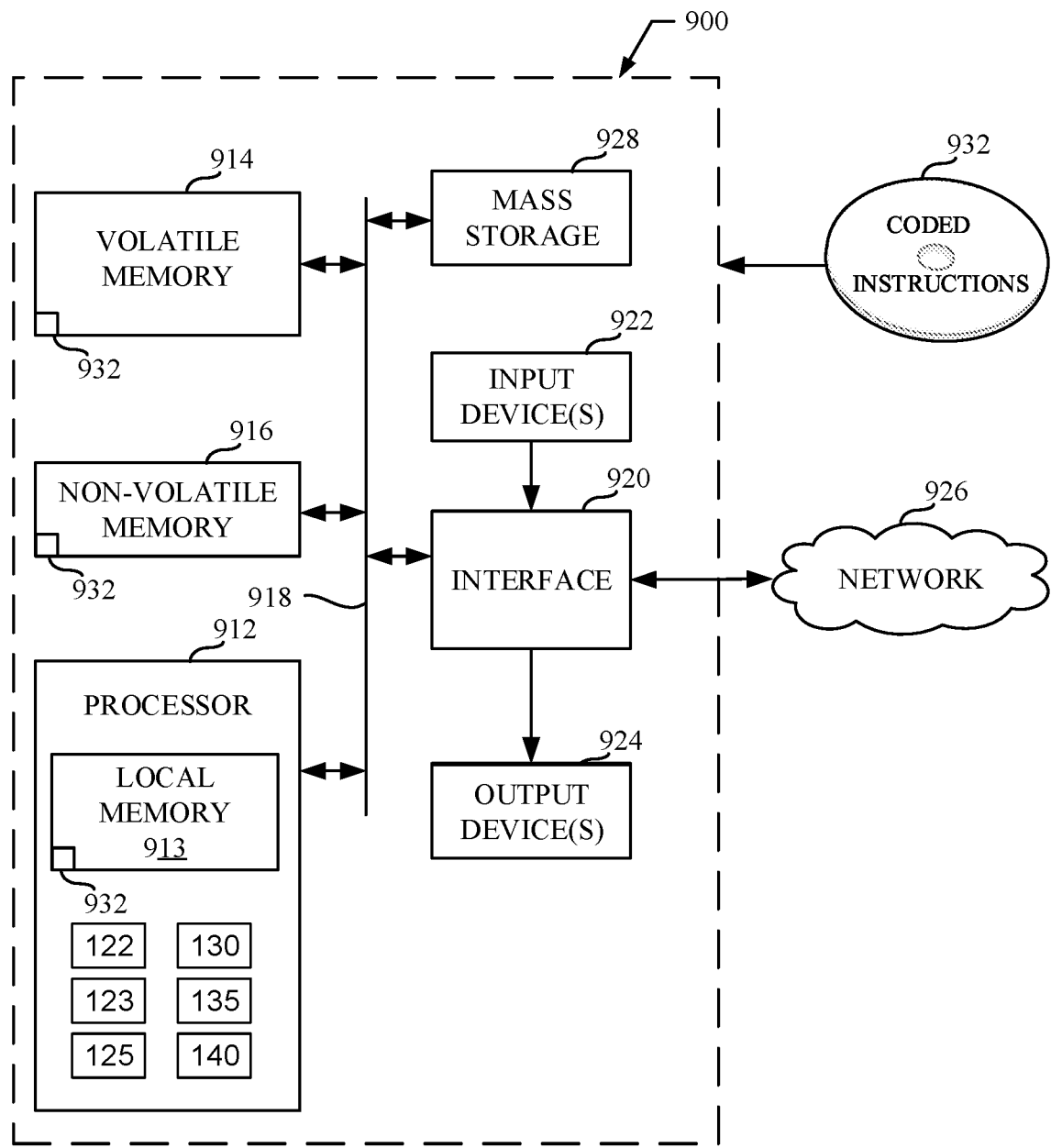
FIG. 9 is a block diagram of an example processing platform structured to execute the instructions of FIGS. 4, 5, and/or 8 to implement the example VPN client of FIG. 1.

FIG. 9 is a block diagram of an example processor platform 900 structured to execute the instructions of FIGS. 4, 5, and 8 to implement the VPN client 120 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example first tunnel establisher 122, the example first communicator 123, the example first traffic selector 125, the example first cryptographic circuitry 130, the example client first tunnel endpoint 135, and the example client second tunnel endpoint 140.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a communicator, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 4, 5, and 8 may be stored in the mass storage device 928, in the volatile memory 914, in the non-volatile memory 916, and/or on a removable non-transitory computer readable storage medium such as a CD or DVD.

Figure 10:
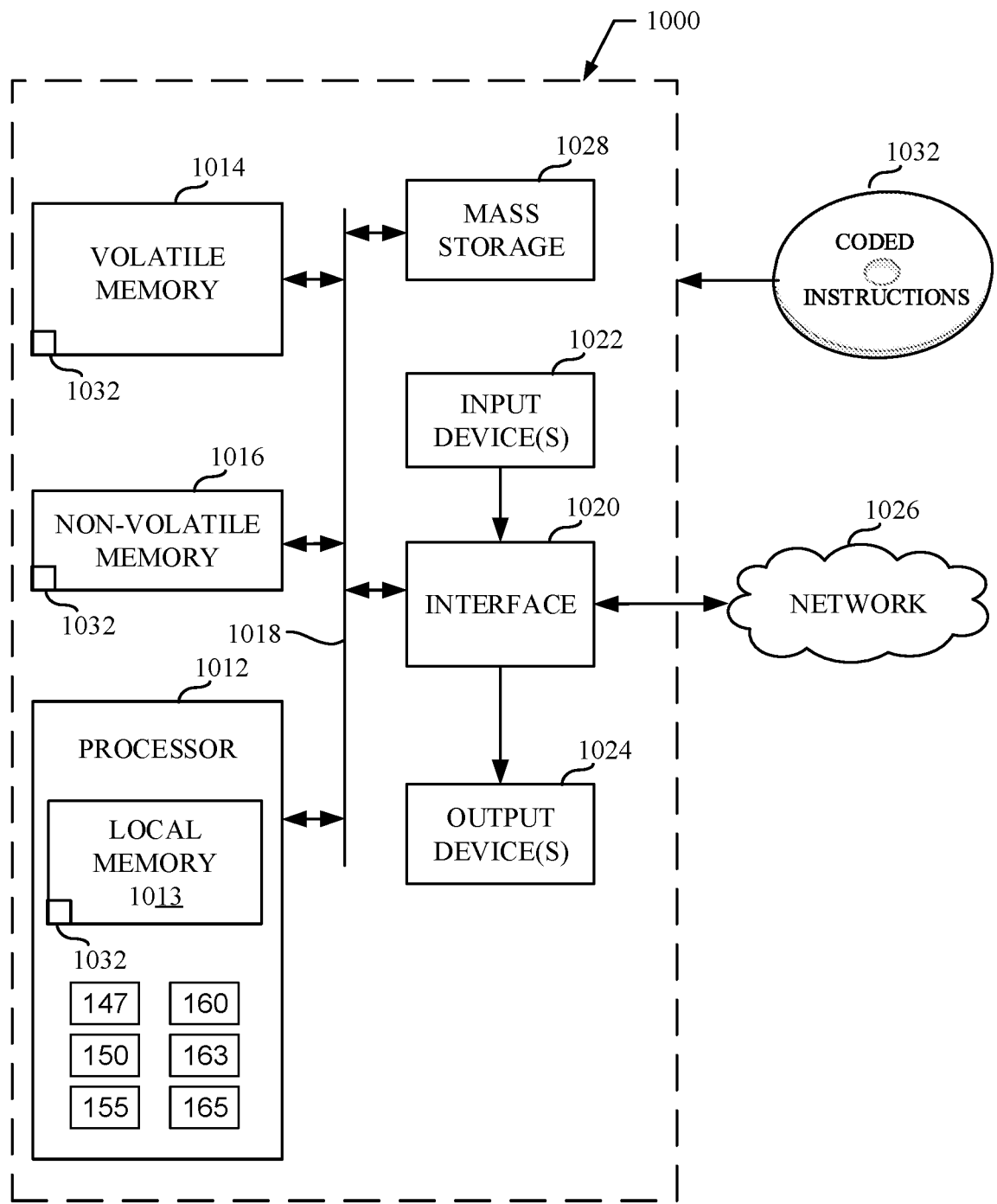
FIG. 10 is a block diagram of an example processing platform structured to execute the instructions of FIGS. 4, 6, and/or 7 to implement the example VPN server of FIG. 1.

FIG. 10 is a block diagram of an example processor platform 1000 structured to execute the instructions of FIGS. 4, 6, and 7 to implement the VPN server 146 of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example second tunnel establisher 147, the example server first tunnel endpoint 150, the example server second tunnel endpoint 155, the example second cryptographic circuitry 160, the example second traffic selector 163, and the example second communicator 165.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a communicator, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 4, 6, and 7 may be stored in the mass storage device 1028, in the volatile memory 1014, in the non-volatile memory 1016, and/or on a removable non-transitory computer readable storage medium such as a CD or DVD.

Figure 11:
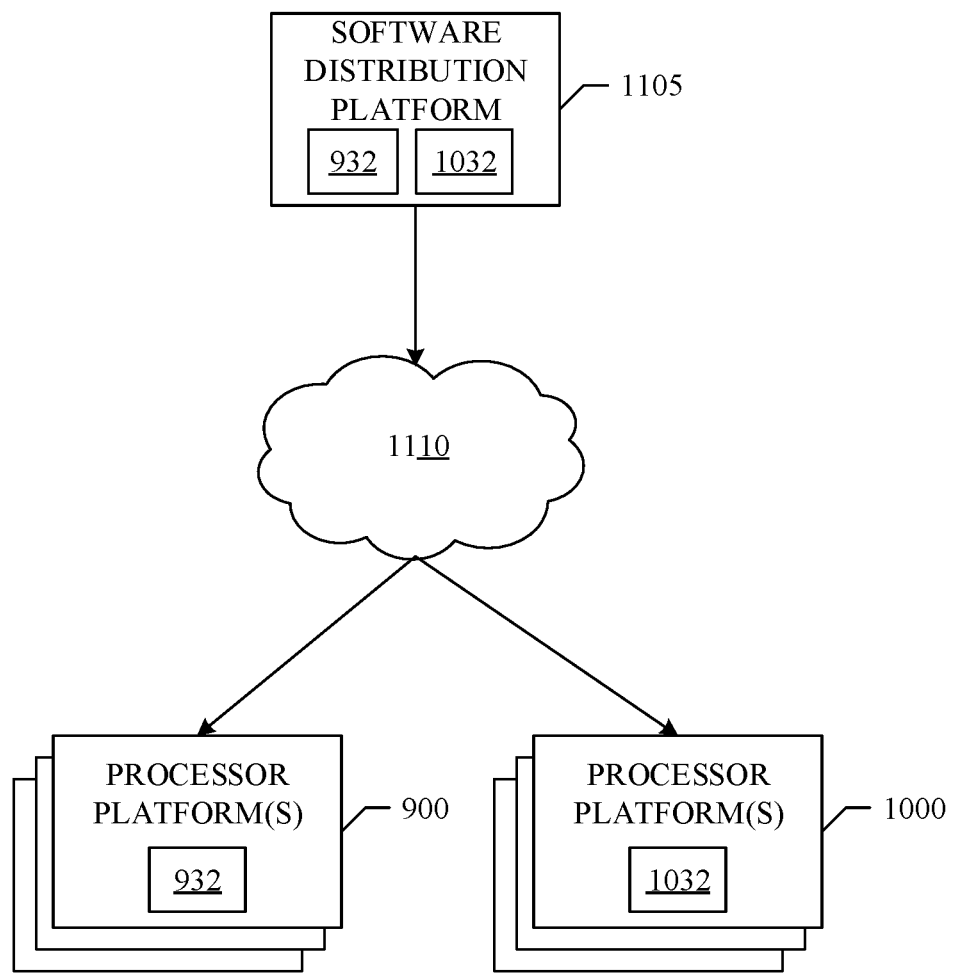
FIG. 11 is a block diagram of an example software distribution platform to distribute software (e.g., software corresponding to the example computer readable instructions of FIGS. 4-8) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1105 to distribute software such as the example computer readable instructions 932 of FIG. 9 and the example computer readable instructions 1032 of FIG. 10 to third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example process 400 of FIG. 4, the example machine readable instructions 500 of FIG. 5, the example machine readable instructions 600 of FIG. 6, the example machine readable instructions 700 of FIG. 7, the example machine readable instructions 800 of FIG. 8, the computer readable instructions 932 of FIG. 9, and the example computer readable instructions 1032 of FIG. 10. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the computer readable instructions 932 and computer readable instructions 1032, which may correspond to the example computer readable instructions 932 and 1032 of FIGS. 9 and 10, as described above. The one or more servers of the example software distribution platform 1105 are in communication with a network 1110, which may correspond to any one or more of the Internet and/or any of the example networks 1110 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 932 and 1032 from the software distribution platform 1105. For example, the software, which may correspond to the example computer readable instructions 932 of FIG. 9 and the example computer readable instructions 1032 of FIG. 10, may be downloaded to the example processor platform 900, which is to execute the computer readable instructions 932 to implement the example VPN client 120 and/or the example processor platform 1000, which is to execute the computer readable instructions 1032 to implement the example VPN server 146. In some example, one or more servers of the software distribution platform 1105 periodically offer, transmit, and/or force updates to the software (e.g., the example computer readable instructions 932 of FIG. 9) to ensure improvements, patches, updates, etc. are distributed and applied to the software at the end user devices.

Figure 12:
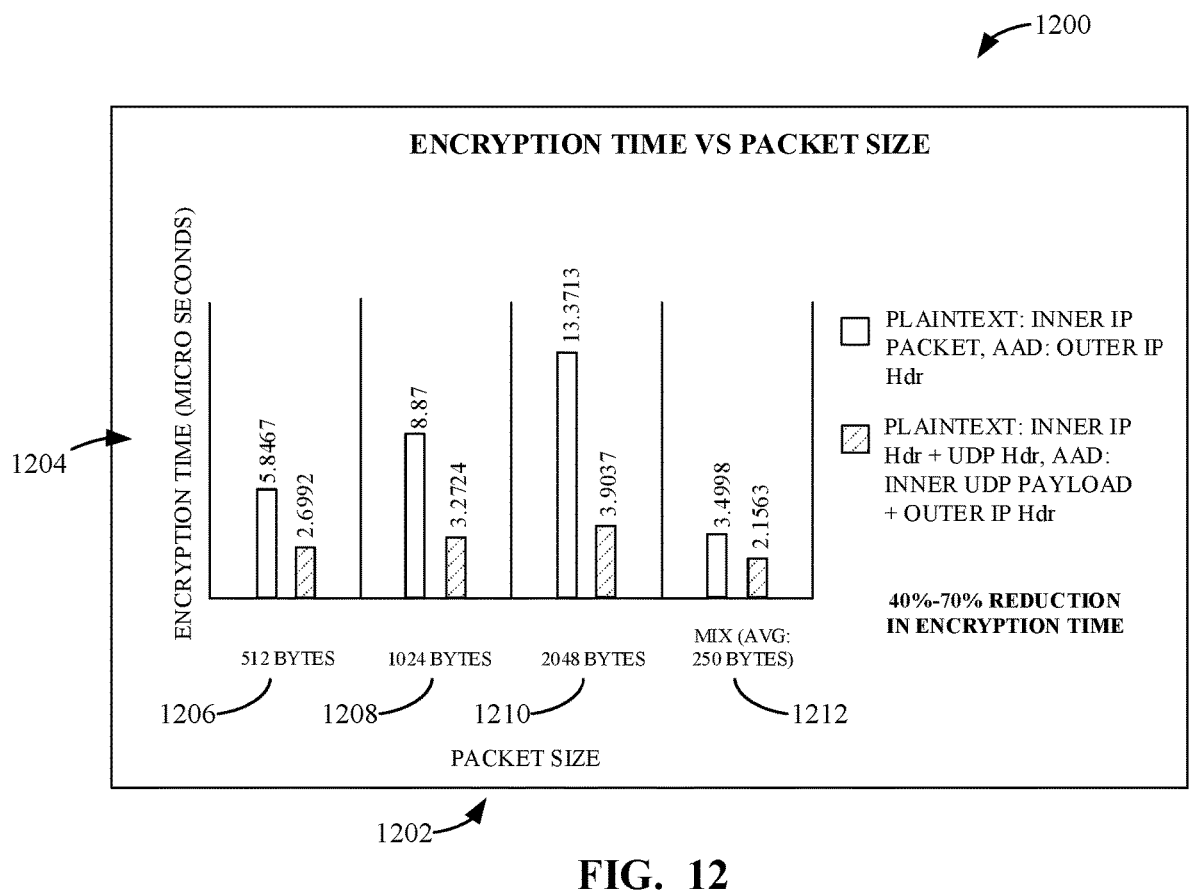
FIG. 12 is a graph comparing the encryption times of the encapsulating security protocol (ESP) and partial encrypted & authenticated security payload (PEASP) protocols.

FIG. 12 is an example graph 1200 comparing the encryption times of the Encapsulating Security Protocol (ESP) and Partial Encrypted & Authenticated Security Payload (PEASP) protocols.

The Encapsulating Security Protocol (ESP) is a protocol for encrypting IP packets before they are sent through a network. The ESP protocol encrypts the entire packet, regardless of any previous encryption on the payload of the IP packet. The Partially Encrypted & Authenticated Security Payload (PEASP) protocol is an example of the implementation of the apparatus, systems, and methods for partially encrypting an IP packet as disclosed herein. The PEASP protocol disclosed herein dynamically sorts IP packets. If the payload of the IP packet uses a QUIC protocol and ESNI, the PEASP protocol partially encrypts the IP packet. If the payload of the IP packet does not use a QUIC protocol and/or ESNI, the PEASP protocol completely encrypts the IP packet.

The graph 1200 includes an example horizontal axis 1202 representing various packet sizes to be encrypted, and an example vertical axis 1204 represents the encryption time in microseconds. The graph 1200 illustrates a comparison of the encryption time between the ESP protocol (illustrated in the graph 1200 by the bars without shading) and the PEASP protocol (illustrated in the graph 1200 by the bars with diagonal shading). The horizontal axis 1202 includes four packet sizes: an example first packet size 1206 of 512 bytes, an example second packet size 1208 of 1024 bytes, an example third packet size 1210 of 2048 bytes, and an example fifth packet size 1212 representing a mix where the average size is 250 bytes. Overall, the PEASP protocol is faster than the ESP protocol across all packet sizes examined. As the packet size increases, the percentage reduction in encryption time increases, with the largest reduction (approximately 70% reduction in encryption time) occurring at the third packet size of 2048 bytes. On average, using the PEASP protocol disclosed herein results in a 40%-70% reduction in encryption time when compared to the ESP protocol.

Figure 13:
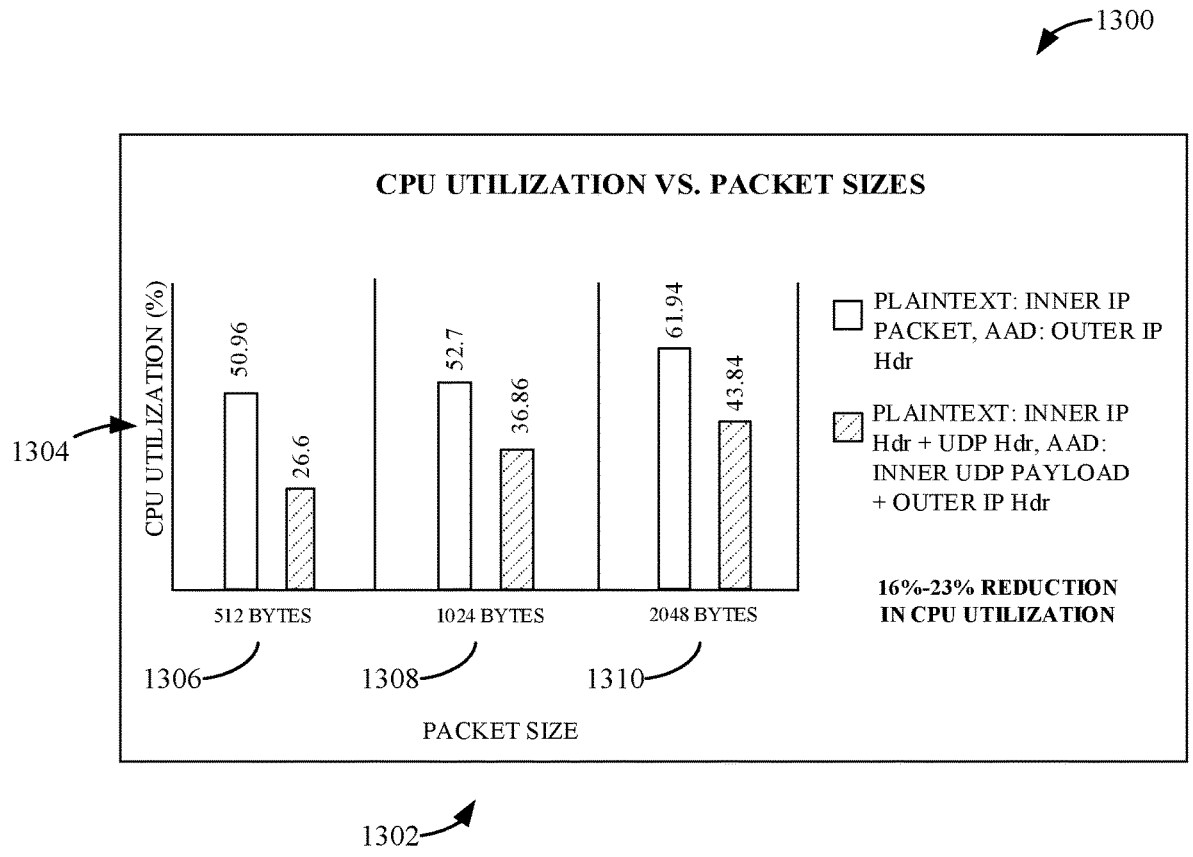
FIG. 13 is a graph comparing the CPU utilization of the encapsulating security protocol (ESP) and partial encrypted & authenticated security payload (PEASP) protocols.

FIG. 13 is an example graph 1300 comparing the CPU utilization of the Encapsulating Security Protocol (ESP) and Partial Encrypted & Authenticated Security Payload (PEASP) protocols.

The graph 1300 illustrates a comparison of the CPU utilization between the ESP protocol and the PEASP protocol disclosed herein. An example horizontal axis 1302 of the graph 1300 represents different packet sizes to be encrypted. In particular, the horizontal axis 1302 includes three different byte sizes of packet; an example first packet size 1306 of 512 bytes, an example second packet size 1308 of 1024 bytes, and an example third packet size 1310 of 2048 bytes. An example vertical axis 1304 of the graph 1300 represents the percent of the CPU utilized by each protocol. As in the graph 1200 of FIG. 12, the left unshaded columns in the graph 1300 represent the ESP protocol, while the diagonally striped columns of each grouping represent the PEASP protocol. In each grouping, the PEASP protocol incurs less CPU utilization than the ESP protocol. On average, using the PEASP protocol results in a 16%-23% reduction in CPU utilization when compared to the ESP protocol.

From the foregoing, it will be appreciated that example methods, apparatus and articles of manufacture have been disclosed that reduce encryption time and CPU utilization needed to encrypt an IP packet, while maintaining the security and confidentiality of the information represented by the IP packet. The disclosed methods, apparatus and articles of manufacture improve the efficiency of using a computing device by reducing the encryption time and CPU utilization needed to encrypt an IP packet. Apparatus, systems, apparatus and articles of manufacture disclosed herein reduce the load on VPN servers and VPN client applications to help achieve better performance and packet latencies. Techniques disclosed herein dynamically identify traffic which is suitable for partial encryption by utilizing different tunnels for packets encrypted with different protocols, preventing redundant encryption for IP packets which are already encrypted with particular protocols. The disclosed methods, apparatus and articles of manufacture are accordingly directed to one or more improvement(s) in the functioning of a computer.

Example methods, apparatus, systems, and articles of manufacture for communicating encrypted data via a virtual private network are disclosed herein. Further examples and combinations thereof include the following:

Example 1 includes a computer system for sending encrypted data via a virtual private network (VPN), the computer system comprising memory including instructions, and one or more processors to execute instructions to cause the one or more processors to establish a first tunnel and a second tunnel between a VPN client and a VPN server, access a request message to be sent via the VPN, determine if a payload of the request message is formatted using a first protocol, determine, in response to the payload being encrypted using the first protocol, whether a packet associated with the request message includes an encrypted server name indication (SNI), and in response to the packet including the encrypted SNI encrypt a header of the request message to form an encrypted header, create an encrypted message including the encrypted header and the payload of the request message, and transmit the encrypted message through the first tunnel.

Example 2 includes the computer system of example 1, wherein the first protocol is a quick user data protocol internet connection (QUIC) protocol.

Example 3 includes the computer system of example 1, wherein the instructions, when executed, cause the one or more processors to access a public key from a naming system server.

Example 4 includes the computer system of example 3, wherein the naming system server is a domain name system (DNS) server.

Example 5 includes the computer system of example 1, wherein to create the encrypted message, the one or more processors is to append the payload of the request message as associated data.

Example 6 includes the computer system of example 1, wherein the request message is a first request message, the payload is a first payload, and the encrypted message is a first encrypted message, wherein the instructions, when executed, cause the one or more processors to access a second request message to be sent via the VPN, determine if a second payload of the second request message is encrypted using the first protocol, and in response to the second payload of the second request message not being encrypted using the first protocol encrypt the second request message to form a second encrypted message, and transmit the second encrypted message through the second tunnel.

Example 7 includes the computer system of example 1, wherein the request message is a first request message, the payload is a first payload, the encrypted message is a first encrypted message and the packet is a first packet, wherein the instructions, when executed, cause the one or more processors to access a second request message to be sent via the VPN, determine if a second payload of the second request message is encrypted using the first protocol, determine, in response to the second payload being encrypted using the first protocol, whether a second packet of the second request message includes an encrypted server name indication (SNI), and in response to the second packet not including the encrypted SNI encrypt the second request message to form a second encrypted message, and transmit the second encrypted message through the second tunnel.

Example 8 includes At least one non-transitory machine readable storage medium comprising instructions that, when executed by a processor, cause the processor to at least establish a first tunnel and a second tunnel between a VPN client and a VPN server, access a request message to be sent between the VPN client and the VPN server, determine if a payload of the request message is encrypted using a first protocol, determine, in response to the payload being encrypted using the first protocol, whether a packet of the request message includes an encrypted server name indication (SNI), and in response to the packet including the encrypted SNI encrypt a header of the request message to form an encrypted header, create an encrypted message including the encrypted header and the payload of the request message, and transmit the encrypted message through the first tunnel.

Example 9 includes the at least one non-transitory machine readable storage medium of example 8, wherein the first protocol is a quick user datagram protocol internet connection (QUIC) protocol.

Example 10 includes the at least one non-transitory machine readable storage medium of example 8, wherein the instructions, when executed, cause the processor to receive a public key from a naming system server.

Example 11 includes the at least one non-transitory machine readable storage medium of example 10, wherein the naming system server is at least one of a domain name system (DNS) over hyptertext transfer protocol secure (HTTPS) or DNS over transport layer security (TLS) server.

Example 12 includes the at least one non-transitory machine readable storage medium of example 8, wherein to create the encrypted message, the instructions, when executed, cause the processor to append the payload of the request message as associated data.

Example 13 includes the at least one non-transitory machine readable storage medium of example 8, wherein the request message is a first request message, the payload is a first payload, and the encrypted message is a first encrypted message, wherein the instructions, when executed, cause the processor to access a second request message to be sent between the VPN client and the VPN server, determine if a second payload of the second request message is encrypted using the first protocol, and in response to the second payload of the second request message not being encrypted using the first protocol encrypt the second request message to form a second encrypted message, and transmit the second encrypted message through the second tunnel.

Example 14 includes the at least one non-transitory machine readable storage medium of example 8, wherein the request message is a first request message, the payload is a first payload, the encrypted message is a first encrypted message, and the packet is a first packet, wherein the instructions, when executed, cause the processor to access a second request message to be sent between the VPN client and the VPN server, determine if a second payload of the second request message is encrypted using the first protocol, determine, in response to the second payload being encrypted using the first protocol, whether a second packet of the second request message includes an encrypted server name indication (SNI), and in response to the second packet not including the encrypted SNI encrypt the second request message to form a second encrypted message, and transmit the second encrypted message through the second tunnel.

Example 15 includes a method for sending encrypted data via a virtual private network (VPN), the method comprising establishing, by executing an instruction with a processor, a first tunnel and a second tunnel between a VPN client and a VPN server, access a request message to be communicated via the VPN, determining, by executing an instruction with the processor, if a payload of the request message is encrypted using a first protocol, determining, by executing an instruction with the processor and in response to the payload being encrypted using the first protocol, whether a packet of the request message includes an encrypted server name indication (SNI), and in response to the packet including the encrypted SNI encrypting, by executing an instruction with the processor, a header of the request message to form an encrypted header, creating, by executing an instruction with the processor, an encrypted message including the encrypted header and the payload of the request message, and transmitting the encrypted message through the first tunnel.

Example 16 includes the method of example 15, wherein the first protocol is a quick user datagram protocol internet connection (QUIC) protocol.

Example 17 includes the method of example 15, wherein the creation of the encrypted message includes appending the payload of the request message as associated data.

Example 18 includes the method of example 15, wherein the request message is a first request message, the payload is a first payload, and the encrypted message is a first encrypted message, the method further including accessing a second request message to be sent via the VPN, determining if a second payload of the second request message is encrypted using the first protocol, and in response to the second payload of the second request message not being encrypted using the first protocol encrypting the second request message to form a second encrypted message, and transmitting the second encrypted message through the second tunnel.

Example 19 includes the method of example 15, wherein the request message is a first request message, the payload is a first payload, the encrypted message is a first encrypted message, and the packet is a first packet, the method further including accessing a second request message to be sent via the VPN, determining if a second payload of the second request message is encrypted using the first protocol, determining, in response to the second payload being encrypted using the first protocol, whether a second packet of the second request message includes an encrypted server name indication (SNI), and in response to the second packet not including the encrypted SNI encrypting the second request message to form a second encrypted message, and transmitting the second encrypted message through the second tunnel.

Example 20 includes a server to distribute first instructions on a network, the server comprising at least one storage device including second instructions, and at least one processor to execute the second instructions to transmit the first instructions over the network, the first instructions, when executed, to cause at least one device to establish a first tunnel and a second tunnel between a VPN client and a VPN server, access a request message to be sent between the VPN client and the VPN server, determine if a payload of the request message is encrypted using a first protocol, determine, in response to the payload being encrypted using the first protocol, whether a packet of the request message includes an encrypted server name indication (SNI), and in response to the packet including the encrypted SNI encrypt a header of the request message to form an encrypted header, create an encrypted message including the encrypted header and the payload of the request message, and transmit the encrypted message through the first tunnel.

Example 21 includes an apparatus to send encrypted data via a virtual private network (VPN), the apparatus comprising means for establishing a first tunnel and a second tunnel between a VPN client and a VPN server, means for communicating to access a request message to be communicated via the VPN, means for selecting to determine if a payload of the request message is encrypted using a first protocol, and determine, in response to the payload being encrypted using the first protocol, whether a packet of the request message includes an encrypted server name indication (SNI), and means for encrypting to, in response to the packet including the encrypted SNI encrypt a header of the request message to form an encrypted header, and create an encrypted message including the encrypted header and the payload of the request message, wherein the means for communicating is to transmit the encrypted message through the first tunnel.

Example 22 includes an apparatus to send encrypted data via a virtual private network (VPN), the apparatus comprising a tunnel establisher to establish a first tunnel and a second tunnel between a VPN client and a VPN server, a communicator to access a request message to be communicated via the VPN, a traffic selector to determine if a payload of the request message is encrypted using a first protocol, and determine, in response to the payload being encrypted using the first protocol, whether a packet of the request message includes an encrypted server name indication (SNI), and cryptographic circuitry to, in response to the packet including the encrypted SNI encrypt a header of the request message to form an encrypted header, and create an encrypted message including the encrypted header and the payload of the request message, wherein the communicator is to transmit the encrypted message through the first tunnel.

Example 23 includes the apparatus of example 22, wherein the first protocol is a quick user data protocol internet connection (QUIC) protocol.

Example 24 includes the apparatus of example 22, wherein to create the encrypted message, the cryptographic circuitry is to append the payload of the request message as associated data.

Example 25 includes the apparatus of example 22, wherein the request message is a first request message, the payload is a first payload, and the encrypted message is a first encrypted message, wherein the communicator is to access a second request message to be sent via the VPN, the traffic selector is to determine if a second payload of the second request message is encrypted using the first protocol, and in response to the second payload of the second request message not being encrypted using the first protocol, the cryptographic circuitry is to encrypt the second request message to form a second encrypted message, and transmit the second encrypted message through the second tunnel.

Example 26 includes the apparatus of example 22, wherein the request message is a first request message, the payload is a first payload, the encrypted message is a first encrypted message, and the packet is a first packet, wherein the communicator is to access a second request message to be sent via the VPN, the traffic selector is to determine if a second payload of the second request message is encrypted using the first protocol, and determine, in response to the second payload being encrypted using the first protocol, whether a second packet of the second request message includes an encrypted server name indication (SNI), wherein, in response to the second packet not including the encrypted SNI, the cryptographic circuitry is to encrypt the second request message to form a second encrypted message, and transmit the second encrypted message through the second tunnel.

Example 27 includes a computer system for receiving encrypted data via a virtual private network (VPN), comprising memory including instructions, and one or more processors to execute instructions to cause the one or more processors to access an encrypted message, determine whether the encrypted message was communicated via a tunnel, and in response to determining the encrypted message was communicated via the tunnel decrypt a header of the encrypted message to create a decrypted header, create a decrypted message including the decrypted header and a payload of the encrypted message, the creation of the decrypted message performed without modifying the payload of the encrypted message, and transmit the decrypted message to a destination.

Example 28 includes the computer system of example 27, wherein the encrypted message is a first encrypted message, the tunnel is a first tunnel, and the decrypted message is a first decrypted message, wherein the instructions, when executed, cause the one or more processors to establish a VPN connection, the VPN connection including the first tunnel and a second tunnel, access a second encrypted message, determine whether the second encrypted message was communicated via the second tunnel, and in response to determining the second encrypted message was communicated via the second tunnel decrypt the second encrypted message to create a second decrypted message, and transmit the second decrypted message to the destination.

Example 29 includes the computer system of example 27, wherein the payload of the encrypted message is encrypted using a quick user data protocol internet connection (QUIC) protocol.

Example 30 includes At least one non-transitory machine readable storage medium comprising instructions that, when executed by a processor, cause a machine to access an encrypted message, determine whether the encrypted message was communicated via a tunnel, and in response to determining the encrypted message was communicated via the tunnel decrypt a header of the encrypted message to create a decrypted header, create a decrypted message including the decrypted header and a payload of the encrypted message, the creation of the decrypted message performed without modifying the payload of the encrypted message, and transmit the decrypted message to a destination.

Example 31 includes the at least one non-transitory machine readable storage medium of example 30, wherein the encrypted message is a first encrypted message, the tunnel is a first tunnel, and the decrypted message is a first decrypted message, wherein the instructions, when executed by the processor, cause the machine to establish a VPN connection, the VPN connection including the first tunnel and a second tunnel, access a second encrypted message, determine whether the second encrypted message was communicated via a second tunnel, and in response to determining the second encrypted message came through the second tunnel decrypt the second encrypted message to create a second decrypted message, and transmit the second decrypted message to the destination.

Example 32 includes a method for receiving encrypted data via a virtual private network (VPN), the method comprising accessing an encrypted message, determining whether the encrypted message was communicated via a tunnel, and in response to determining the encrypted message was communicated via the tunnel decrypt a header of the encrypted message to create a decrypted header, create a decrypted message including the decrypted header and a payload of the encrypted message, the creation of the decrypted message performed without modifying the payload of the encrypted message, and transmit the decrypted message to a destination.

Example 33 includes the method of example 32, wherein the encrypted message is a first encrypted message, the tunnel is a first tunnel, and the decrypted message is a first decrypted message, the method further including establishing a VPN connection, the VPN connection including the first tunnel and a second tunnel, accessing a second encrypted message, determining whether the second encrypted message was communicated via a second tunnel, and in response to determining that the second encrypted message was communicated via the second tunnel decrypting the second encrypted message to create a second decrypted message, and transmitting the second decrypted message to the destination.

Example 34 includes a server to distribute first instructions on a network, the server comprising at least one storage device including second instructions, and at least one processor to execute the second instructions to transmit the first instructions over the network, the first instructions, when executed, to cause at least one device to access an encrypted message, determine whether the encrypted message was communicated via a tunnel, and in response to determining the encrypted message was communicated via the tunnel decrypt a header of the encrypted message to create a decrypted header, create a decrypted message including the decrypted header and a payload of the encrypted message, the creation of the decrypted message performed without modifying the payload of the encrypted message, and transmit the decrypted message to a destination.

Example 35 includes an apparatus to receive encrypted data via a virtual private network (VPN), the apparatus comprising a communicator to access an encrypted message, a traffic selector to determine whether the encrypted message was communicated via a tunnel, and cryptographic circuitry to, in response to determining the encrypted message was communicated via the tunnel decrypt a header of the encrypted message to create a decrypted header, and create a decrypted message including the decrypted header and a payload of the encrypted message, the creation of the decrypted message performed without modifying the payload of the encrypted message, wherein the communicator is to transmit the decrypted message to a destination.

Example 36 includes the apparatus of example 35, wherein the encrypted message is a first encrypted message, the tunnel is a first tunnel, and the decrypted message is a first decrypted message, the apparatus further including a tunnel establisher to establish a VPN connection, the VPN connection including the first tunnel and a second tunnel, wherein the communicator is to access a second encrypted message, wherein the traffic selector is to determine whether the second encrypted message was communicated via a second tunnel, wherein the cryptographic circuitry, in response to determining the second encrypted message was communicated via the second tunnel, is to decrypt the second encrypted message to create a second decrypted message, and wherein the communicator is to transmit the second decrypted message to the destination.

Example 37 includes an apparatus to send encrypted data via a virtual private network (VPN), the apparatus comprising means for establishing a first tunnel and a second tunnel between a VPN client and a VPN server, means for communicating to access a request message to be communicated via the VPN, means for selecting to determine if a payload of the request message is encrypted using a first protocol, and determine, in response to the payload being encrypted using the first protocol, whether a packet associated with the request message includes an encrypted server name indication (SNI), and means for encrypting to, in response to the packet associated with the request message including the encrypted SNI: encrypt a header of the request message to form an encrypted header, and create an encrypted message including the encrypted header and the payload of the request message, wherein the means for communicating is to transmit the encrypted message through the first tunnel.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computer system for sending encrypted data via a virtual private network (VPN), the computer system comprising:
   memory including instructions; and
   one or more processors to execute instructions to cause the one or more processors to:
      establish a first tunnel and a second tunnel between a VPN client and a VPN server, the first tunnel to facilitate transmission of packets identified for partial encryption, the second tunnel to facilitate transmission of packets identified for full encryption;
      access a request message to be sent via the VPN;
      determine if a payload of the request message is formatted using a first protocol;
      determine, in response to the payload being encrypted using the first protocol, whether a packet associated with the request message includes a server name indication (SNI) encrypted with a public key obtained based on a redirection from a first domain name service (DNS) server to a second DNS server; and
      in response to the packet including the encrypted SNI:
         encrypt an inner IP header and a user datagram protocol header of the request message to form an encrypted inner header;
         create an encrypted message including the encrypted inner IP header and the payload of the request message, the payload to include a quick user data protocol internet connection (QUIC) public header and a QUIC encrypted header stored as associated data; and
         transmit the encrypted message through the first tunnel.

2. The computer system of claim 1, wherein the first protocol is the QUIC protocol.

3. The computer system of claim 1, wherein to create the encrypted message, the one or more processors is to append the payload of the request message as associated data.

4. The computer system of claim 1, wherein the request message is a first request message, the payload is a first payload, and the encrypted message is a first encrypted message, wherein the instructions, when executed, cause the one or more processors to:
   access a second request message to be sent via the VPN;
   determine if a second payload of the second request message is encrypted using the first protocol; and
   in response to the second payload of the second request message not being encrypted using the first protocol:
      encrypt the second request message to form a second encrypted message; and
      transmit the second encrypted message through the second tunnel.

5. The computer system of claim 1, wherein the request message is a first request message, the payload is a first payload, the encrypted message is a first encrypted message and the packet is a first packet, wherein the instructions, when executed, cause the one or more processors to:
   access a second request message to be sent via the VPN;
   determine if a second payload of the second request message is encrypted using the first protocol;
   determine, in response to the second payload being encrypted using the first protocol, whether a second packet of the second request message includes an encrypted server name indication (SNI); and
   in response to the second packet not including the encrypted SNI:
      encrypt the second request message to form a second encrypted message; and
      transmit the second encrypted message through the second tunnel.

6. The system of claim 1, wherein the encrypted message further includes an outer packet including an outer IP header and a partially encrypted and authenticated security payload header stored as associated data.

7. At least one non-transitory machine readable storage medium comprising instructions that, when executed by a processor, cause the processor to at least:
   establish a first tunnel and a second tunnel between a VPN client and a VPN server, the first tunnel to facilitate transmission of packets identified for partial encryption, the second tunnel to facilitate transmission of packets identified for full encryption;
   access a request message to be sent between the VPN client and the VPN server;
   determine if a payload of the request message is encrypted using a first protocol;
   determine, in response to the payload being encrypted using the first protocol, whether a packet of the request message includes a server name indication (SNI) obtained based on a redirection from a first domain name service (DNS) server to a second DNS server; and
   in response to the packet including the encrypted SNI:
      encrypt an inner IP header and a user datagram protocol header of the request message to form an encrypted inner header;
      create an encrypted message including the encrypted inner header and the payload of the request message, the payload to include a quick user data protocol internet connection (QUIC) public header and a QUIC encrypted header stored as associated data; and
      transmit the encrypted message through the first tunnel.

8. The at least one non-transitory machine readable storage medium of claim 7, wherein the first protocol the QUIC protocol.

9. The at least one non-transitory machine readable storage medium of claim 7, wherein to create the encrypted message, the instructions, when executed, cause the processor to append the payload of the request message as associated data.

10. The at least one non-transitory machine readable storage medium of claim 7, wherein the request message is a first request message, the payload is a first payload, and the encrypted message is a first encrypted message, wherein the instructions, when executed, cause the processor to:
   access a second request message to be sent between the VPN client and the VPN server;
   determine if a second payload of the second request message is encrypted using the first protocol; and
   in response to the second payload of the second request message not being encrypted using the first protocol:
      encrypt the second request message to form a second encrypted message; and transmit the second encrypted message through the second tunnel.

11. The at least one non-transitory machine readable storage medium of claim 7, wherein the request message is a first request message, the payload is a first payload, the encrypted message is a first encrypted message, and the packet is a first packet, wherein the instructions, when executed, cause the processor to:
 access a second request message to be sent between the VPN client and the VPN server;
 determine if a second payload of the second request message is encrypted using the first protocol;
 determine, in response to the second payload being encrypted using the first protocol, whether a second packet of the second request message includes an encrypted server name indication (SNI); and
 in response to the second packet not including the encrypted SNI:
  encrypt the second request message to form a second encrypted message; and
  transmit the second encrypted message through the second tunnel.

12. The non-transitory machine readable storage medium of claim 7, wherein the encrypted message further includes an outer packet including an outer IP header and a partially encrypted and authenticated security payload header stored as associated data.

13. The at least one non-transitory machine readable storage medium of claim 8, wherein the second DNS server is at least one of a domain name system (DNS) over hypertext transfer protocol secure (HTTPS) or DNS over transport layer security (TLS) server.

14. A method for sending encrypted data via a virtual private network (VPN), the method comprising:
 establishing, by executing an instruction with a processor, a first tunnel and a second tunnel between a VPN client and a VPN server, the first tunnel to facilitate transmission of packets identified for partial encryption, the second tunnel to facilitate transmission of packets identified for full encryption;
 access a request message to be communicated via the VPN;
 determining, by executing an instruction with the processor, if a payload of the request message is encrypted using a first protocol;
 determining, by executing an instruction with the processor and in response to the payload being encrypted using the first protocol, whether a packet of the request message includes a server name indication (SNI) encrypted with a public key obtained based on a redirection from a first domain name service (DNS) server to a second DNS server; and
 in response to the packet including the encrypted SNI:
  encrypting, by executing an instruction with the processor, an inner IP header and a user datagram protocol header of the request message to form an encrypted inner header;
  creating, by executing an instruction with the processor, an encrypted message including the encrypted inner IP header and the payload of the request message, the payload to include a quick user data protocol internet connection (QUIC) public header and a QUIC encrypted header; and
  transmitting the encrypted message through the first tunnel.

15. The method of claim 14, wherein the first protocol is the QUIC protocol.

16. The method of claim 14, wherein the creation of the encrypted message includes appending the payload of the request message as associated data.

17. The method of claim 14, wherein the request message is a first request message, the payload is a first payload, and the encrypted message is a first encrypted message, the method further including:
 accessing a second request message to be sent via the VPN;
 determining if a second payload of the second request message is encrypted using the first protocol; and
 in response to the second payload of the second request message not being encrypted using the first protocol:
  encrypting the second request message to form a second encrypted message; and
  transmitting the second encrypted message through the second tunnel.

18. The method of claim 14, wherein the request message is a first request message, the payload is a first payload, the encrypted message is a first encrypted message, and the packet is a first packet, the method further including:
 accessing a second request message to be sent via the VPN;
 determining if a second payload of the second request message is encrypted using the first protocol;
 determining, in response to the second payload being encrypted using the first protocol, whether a second packet of the second request message includes an encrypted server name indication (SNI); and
 in response to the second packet not including the encrypted SNI:
  encrypting the second request message to form a second encrypted message; and
  transmitting the second encrypted message through the second tunnel.

19. The method of claim 14, wherein the encrypted message further includes an outer packet including an outer IP header and a partially encrypted and authenticated security payload header stored as associated data.

* * * * *